United States Patent
Kaneko et al.

(10) Patent No.: US 10,865,489 B2
(45) Date of Patent: Dec. 15, 2020

(54) ION EXCHANGE MEMBRANE FOR ALKALI CHLORIDE ELECTROLYSIS, AND ALKALI CHLORIDE ELECTROLYSIS APPARATUS

(71) Applicant: AGC Inc., Chiyoda-ku (JP)

(72) Inventors: Takayuki Kaneko, Chiyoda-ku (JP); Hiromitsu Kusano, Chiyoda-ku (JP); Yasushi Yamaki, Chiyoda-ku (JP); Takuo Nishio, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 67 days.

(21) Appl. No.: 15/416,618

(22) Filed: Jan. 26, 2017

(65) Prior Publication Data
US 2017/0137952 A1   May 18, 2017

Related U.S. Application Data

(63) Continuation of application No. PCT/JP2015/073401, filed on Aug. 20, 2015.

(30) Foreign Application Priority Data

Aug. 20, 2014  (JP) .................... 2014-167278

(51) Int. Cl.
  *C25B 13/08*   (2006.01)
  *C08J 5/22*    (2006.01)
  (Continued)

(52) U.S. Cl.
  CPC .............. *C25B 13/08* (2013.01); *B01J 39/20* (2013.01); *B01J 47/12* (2013.01); *C08J 5/2237* (2013.01);
  (Continued)

(58) Field of Classification Search
  CPC .. C25B 9/08–9/10; C25B 13/00; C25B 13/02; C25B 13/04; C25B 13/08;
  (Continued)

(56) References Cited

U.S. PATENT DOCUMENTS

| 4,498,961 A * | 2/1985 | Lazarz ................... C25B 13/08 204/252 |
| 2002/0034904 A1* | 3/2002 | Sakuma ................. D03D 15/00 442/194 |

(Continued)

FOREIGN PATENT DOCUMENTS

| JP | 59-219487 | 12/1984 |
| JP | 4-308096 | 10/1992 |

(Continued)

OTHER PUBLICATIONS

MiniFibers ("Fiber Measurement Conversions", 2018). (Year: 2018).*

(Continued)

*Primary Examiner* — Alexander W Keeling
(74) *Attorney, Agent, or Firm* — Oblon, McClelland, Maier & Neustadt, L.L.P.

(57) ABSTRACT

To provide an ion exchange membrane for alkali chloride electrolysis, which has low membrane resistance and which reduces the electrolysis voltage during alkali chloride electrolysis, even if the spacing between reinforcing yarns is made narrow to increase the membrane strength. This ion exchange membrane 1 for alkali chloride electrolysis comprises a fluoropolymer containing ion exchange groups; a reinforcing material embedded in the fluoropolymer and formed of reinforcing yarns and optionally contained sacrificial yarns; and elution holes of the sacrificial yarns present between the reinforcing yarns, wherein in a cross section perpendicular to the length direction of the reinforcing yarns forming the reinforcing material, the average distance (d1) from the center of a reinforcing yarn 22 to the center of the adjacent reinforcing yarn 22 is from 750 to 1,000 μm, the total area (S) obtained by adding the cross-sectional area of an elution hole 28 and the cross-sectional area of a sacrificial yarn 24 remaining in the elution hole 28 is from 500 to 5,000

(Continued)

μm² per elution hole, and the number n of elution holes 28 between adjacent reinforcing yarns 22 is from 4 to 6.

18 Claims, 1 Drawing Sheet (51) Int. Cl.
  *B01J 39/20* (2006.01)
  *B01J 47/12* (2017.01)
  *C25B 9/00* (2006.01)
  *C25B 1/46* (2006.01)
(52) U.S. Cl.
  CPC .............. *C08J 5/2281* (2013.01); *C25B 1/46* (2013.01); *C25B 9/00* (2013.01); *C08J 2327/18* (2013.01); *C08J 2329/10* (2013.01); *C08J 2427/18* (2013.01); *C08J 2467/00* (2013.01)
(58) Field of Classification Search
  CPC ........ H01M 2/14; H01M 2/16–2/1693; H01M 2/18; H01M 2/185; B01J 47/12; B01J 39/20; C08J 5/2237; C08J 5/2281; C08J 2327/18; C08J 2329/10; C08J 2427/18
  See application file for complete search history.

(56) References Cited

U.S. PATENT DOCUMENTS

| | | | |
|---|---|---|---|
| 2012/0234674 A1* | 9/2012 | Kameyama | C25B 13/02 |
| | | | 204/252 |
| 2014/0360868 A1 | 12/2014 | Yamaki et al. | |
| 2017/0218527 A1* | 8/2017 | Yamaki | C25B 13/08 |

FOREIGN PATENT DOCUMENTS

| | | |
|---|---|---|
| JP | 2002-79114 | 3/2002 |
| JP | 2004-43594 | 2/2004 |
| JP | WO2013/129399 | 7/2015 |
| WO | WO 2011/052538 A1 | 5/2011 |
| WO | WO 2013/129399 A1 | 9/2013 |

OTHER PUBLICATIONS

International Search Report dated Nov. 17, 2015 in PCT/JP2015/073401, filed on Aug. 20, 2015.

\* cited by examiner

ION EXCHANGE MEMBRANE FOR ALKALI CHLORIDE ELECTROLYSIS, AND ALKALI CHLORIDE ELECTROLYSIS APPARATUS

TECHNICAL FIELD

The present invention relates to an ion exchange membrane for alkali chloride electrolysis, and an alkali chloride electrolysis apparatus.

BACKGROUND ART

As an ion exchange membrane to be used in an alkali chloride electrolysis method for producing an alkali hydroxide and chlorine by electrolyzing an alkali chloride aqueous solution such as seawater, an electrolyte membrane made of a fluoropolymer having ion-exchange groups (carboxylic acid groups or carboxylate groups, and sulfonic acid groups or sulfonate groups) is known.

In order to maintain the mechanical strength and dimensional stability, the electrolyte membrane is usually reinforced by a reinforcing material made of reinforcing yarns (such as polytetrafluoroethylene (hereinafter referred to as PTFE.) yarns). However, with an ion-exchange membrane having a reinforcing material made of PTFE yarns, etc., the membrane resistance tends to be high, and the electrolysis voltage tends to increase.

Therefore, a method to produce an ion exchange membrane by using a reinforcing woven fabric obtained by interweaving reinforcing yarns of PTFE, etc. and sacrificial yarns soluble in an alkaline aqueous solution, such as polyethylene terephthalate (hereinafter referred to as PET) yarns, has been proposed (e.g. Patent Document 1).

When such a reinforcing woven fabric is in contact with an alkaline aqueous solution in the production process of an ion exchange membrane, the sacrificial yarns will be eluted, and therefore, the reinforcing woven fabric presents no influence to the membrane resistance at the time of the main operation of the alkali chloride electrolysis by using the obtained ion exchange membrane.

PRIOR ART DOCUMENT

Patent Document

Patent Document 1: JP-A-2004-43594

DISCLOSURE OF INVENTION

Technical Problem

In the ion exchange membrane produced from the above-mentioned reinforcing woven fabric, in order to enhance the membrane strength, it is important to further narrow the spacing between reinforcing yarns. However, if the spacing between reinforcing yarns is narrowed, the membrane resistance will increase, and the electrolysis voltage becomes high. Therefore, it is difficult to reduce the electrolysis voltage, while increasing the membrane strength of the ion exchange membrane.

It is an object of the present invention to provide an ion exchange membrane for alkali chloride electrolysis which has a low membrane resistance and which is capable of reducing the electrolysis voltage during the alkali chloride electrolysis, even if the spacing between reinforcing yarns is made narrow in order to increase the membrane strength, and an alkali chloride electrolysis apparatus using such an ion exchange membrane for alkali chloride electrolysis.

Solution to Problem

The present invention has the following constructions.

(1) An ion exchange membrane for alkali chloride electrolysis comprising a fluoropolymer having ion exchange groups, a reinforcing material embedded in the fluoropolymer and formed of reinforcing yarns and optionally contained sacrificial yarns, and elution holes of the sacrificial yarns present between the reinforcing yarns, characterized in that in a cross section perpendicular to the length direction of the reinforcing yarns forming the reinforcing material, the average distance (d1) from the center of a reinforcing yarn to the center of the adjacent reinforcing yarn is from 750 to 1,000 μm, and the total area (S) obtained by adding the cross-sectional area of an elution hole and the cross-sectional area of a sacrificial yarn remaining in the elution hole is from 500 to 5,000 μm² per elution hole, and the number n of elution holes between adjacent reinforcing yarns is from 4 to 6.

(2) The ion exchange membrane for alkali chloride electrolysis according to the above (1), wherein a relationship is established to satisfy the following formula (1) in a cross section perpendicular to the length direction of the reinforcing yarns:

$$0.5 \leq \{d2/d1 \times (n+1)\} \leq 1.5 \quad (1)$$

provided that the symbols in the formula (1) have the following meanings, d1: the average distance from the center of a reinforcing yarn to the center of the adjacent reinforcing yarn, d2: the average distance from the center of an elution hole to the center of the adjacent elution hole, n: number of elution holes between adjacent reinforcing yarns.

(3) The ion exchange membrane for alkali chloride electrolysis according to the above (2), wherein a relationship is established to satisfy the following formula (1') at all measurement points measured to determine the average distance (d2) in a cross section perpendicular to the length direction of the reinforcing yarns:

$$0.4 \leq \{d2'/d1 \times (n+1)\} \leq 1.6 \quad (1')$$

provided that the symbols in the formula (1') have the following meanings, d2': the distance from the center of an elution hole to the center the adjacent elution hole, d1 and n: the same as above.

(4) The ion exchange membrane for alkali chloride electrolysis according to any one of the above (1) to (3), wherein a relationship is established to satisfy the following formula (2) in a cross section perpendicular to the length direction of the reinforcing yarns:

$$0.5 \leq \{d3/d1 \times (n+1)\} \leq 1.5 \quad (2)$$

provided that the symbols in the formula (2) have the following meanings, d3: the average distance from the center of a reinforcing yarn to the center of the adjacent elution hole, d1 and n: the same as above.

(5) The ion exchange membrane for alkali chloride electrolysis according to the above (4), wherein a relationship is established to satisfy the following formula (2') at all measurement points measured to determine the average distance (d3) in a cross section perpendicular to the length direction of the reinforcing yarns:

$$0.4 \le \{d3'/d1 \times (n+1)\} \le 1.6 \quad (2')$$

provided that the symbols in the formula (2') have the following meanings, d3': the distance from the center of a reinforcing yarn to the center of the adjacent elution hole, d1 and n: the same as above.

(6) The ion exchange membrane for alkali chloride electrolysis according to any one of the above (1) to (5), wherein the widths of said reinforcing yarns as seen from the direction perpendicular to the fabric surface of the reinforcing fabric are from 70 to 160 μm.

(7) The ion exchange membrane for alkali chloride electrolysis according to any one of the above (1) to (6), wherein a fluoropolymer having groups convertible to ion exchange groups includes a fluoropolymer having carboxylic acid functional groups and a fluoropolymer having sulfonic acid functional groups, and the reinforcing material is embedded in the fluoropolymer having sulfonic acid functional groups.

(8) An alkali chloride electrolysis apparatus comprising an electrolytic cell provided with a cathode and an anode, and an ion exchange membrane for alkali chloride electrolysis as defined in any one of the above (1) to (7) partitioning a cathode chamber on the cathode side and an anode chamber on the anode side in the electrolytic cell.

(9) A method for producing an ion exchange membrane for alkali chloride electrolysis, which comprises obtaining a reinforcing precursor membrane having a reinforcing fabric composed of reinforcing yarns and sacrificial yarns, embedded in a precursor membrane comprising a fluoropolymer having groups convertible to ion exchange groups, and then contacting the reinforcing precursor membrane to an alkaline aqueous solution to convert the groups convertible to ion exchange groups, to ion exchange groups, and at the same time to elute at least a portion of the sacrificial yarns in the reinforcing fabric, thereby to obtain an ion exchange membrane comprising a fluoropolymer having ion-exchange groups, a reinforcing material having at least a portion of the sacrificial yarns in the reinforcing fabric eluted, and elution holes, characterized in that in a cross section perpendicular to the length direction of the reinforcing yarns forming the reinforcing material in the ion exchange membrane, the total area (S) obtained by adding the cross-sectional area of an elution hole and the cross-sectional area of a sacrificial yarn remaining in the elution hole, is from 500 to 5,000 μm$^2$ per elution hole, and the number n of elution holes between adjacent reinforcing yarns is from 4 to 6.

(10) The method for producing an ion exchange membrane for alkali chloride electrolysis according to the above (9), wherein a relationship is established to satisfy the following formula (1) in a cross section perpendicular to the length direction of the reinforcing yarns:

$$0.5 \le \{d2/d1 \times (n+1)\} \le 1.5 \quad (1)$$

provided that the symbols in the formula (1) have the following meanings, d1: the average distance from the center of a reinforcing yarn to the center of the adjacent reinforcing yarn, d2: the average distance from the center of an elution hole to the center of the adjacent elution hole, n: number of elution holes between adjacent reinforcing yarns.

(11) The method for producing an ion exchange membrane for alkali chloride electrolysis according to the above (10), wherein a relationship is established to satisfy the following formula (1') at all measurement points measured to determine the average distance (d2) in a cross section perpendicular to the length direction of the reinforcing yarns:

$$0.4 \le \{d2'/d1 \times (n+1)\} \le 1.6 \quad (1')$$

provided that the symbols in the formula (1') have the following meanings, d2': the distance from the center of an elution hole to the center the adjacent elution hole, d1 and n: the same as above.

(12) The method for producing an ion exchange membrane for alkali chloride electrolysis according to any one of the above (9) to (11), wherein a relationship is established to satisfy the following formula (2) in a cross section perpendicular to the length direction of the reinforcing yarns:

$$0.5 \le \{d3/d1 \times (n+1)\} \le 1.5 \quad (2)$$

provided that the symbols in the formula (2) have the following meanings, d3: the average distance from the center of a reinforcing yarn to the center of the adjacent elution hole or sacrificial yarn, d1 and n: the same as above.

(13) The method for producing an ion exchange membrane for alkali chloride electrolysis according to the above (12), wherein a relationship is established to satisfy the following formula (2') at all measurement points measured to determine the average distance (d3) in a cross section perpendicular to the length direction of the reinforcing yarns:

$$0.4 \le \{d3'/d1 \times (n+1)\} \le 1.6 \quad (2')$$

provided that the symbols in the formula (2') have the following meanings, d3': the distance from the center of a reinforcing yarn to the center of the adjacent elution hole, d1 and n: the same as above.

(14) The method for producing an ion exchange membrane for alkali chloride electrolysis according to any one of the above (9) to (13), wherein the widths of the reinforcing yarns as seen from the direction perpendicular to the fabric surface of the reinforcing fabric are from 70 to 160 μm.

(15) A method for producing an alkaline chloride electrolysis apparatus, characterized by obtaining an ion exchange membrane for alkali chloride electrolysis by the method as defined in any one of the above (9) to (14), and then disposing the ion exchange membrane as an electrolyte membrane partitioning a cathode chamber on the cathode side and an anode chamber on the anode side in the electrolytic cell.

Advantageous Effects of Invention

The ion exchange membrane for alkali chloride electrolysis of the present invention has low membrane resistance and is capable of reducing the electrolysis voltage during the alkaline chloride electrolysis even if the spacing between reinforcing yarns is made narrow to increase the membrane strength.

The alkali chloride electrolysis apparatus of the present invention has an ion-exchange membrane for alkali chloride electrolysis having a high membrane strength, and whereby the membrane resistance is low, and the electrolysis voltage at the time of alkali chloride electrolysis is low.

According to the method for producing an ion exchange membrane for alkali chloride electrolysis of the present invention, it is possible to produce an ion exchange membrane for alkali chloride electrolysis which has low membrane resistance and which is capable of reducing the electrolysis voltage during the alkaline chloride electrolysis, even if the spacing between reinforcing yarns is made narrow to increase the membrane strength.

According to the method for producing an alkali chloride electrolysis apparatus of the present invention, it is possible to produce an alkali chloride electrolysis apparatus which has an ion-exchange membrane for alkali chloride electrolysis having a high membrane strength, and whereby the membrane resistance is low, and the electrolysis voltage at the time of alkali chloride electrolysis is low.

DESCRIPTION OF EMBODIMENTS

The following definitions of terms apply throughout the present specification including claims.

An "ion exchange group" is a group wherein at least a portion of ions contained therein may be exchanged for another ion. The following carboxylic acid functional group or sulfonic acid functional group may, for example, be mentioned.

A "carboxylic acid functional group" means a carboxylic acid group (—COOH) or a carboxylate group (—COOM$^1$, wherein M$^1$ is an alkali metal or a quaternary ammonium base).

A "sulfonic acid functional group" means a sulfonic acid group (—SO$_3$H) or a sulfonate group (—SO$_3$M$^2$, wherein M$^2$ is an alkali metal or a quaternary ammonium base).

A "group convertible to an ion exchange group" means a group which can be converted to an ion exchange group by a known treatment such as hydrolysis treatment, acid form treatment, etc.

A "group convertible to a carboxylic acid functional group" is a group which can be converted to a carboxylic acid functional group by a known treatment such as hydrolysis treatment, acid form treatment, etc.

A "group convertible to a sulfonic acid functional group" is a group which can be converted to a sulfonic acid functional group by a known treatment such as hydrolysis treatment, acid form treatment, etc.

A "fluoropolymer" means a polymer compound having fluorine atom(s) in the molecule.

A "perfluorocarbon polymer" means a polymer wherein all of hydrogen atoms bonded to carbon atoms in the polymer are substituted by fluorine atoms. Some of the fluorine atoms in the perfluorocarbon polymer may be substituted by chlorine atom(s) or bromine atom(s).

A "monomer" means a compound having a polymerization reactive carbon-carbon double bond.

A "fluoromonomer" means a monomer having fluorine atom(s) in the molecule.

A "unit" means a moiety derived from a monomer present in a polymer to constitute the polymer. For example, in a case where a unit is formed by addition polymerization of a monomer having a carbon-carbon unsaturated double bond, the unit derived from the monomer is a divalent unit formed by cleavage of the unsaturated double bond. Further, a unit may be a unit obtained by, after forming a polymer having a structure of a certain unit, chemically converting the unit. In the following, in some cases, units derived from an individual monomer may be represented by a name having the monomer's name followed by "units".

A "reinforcing fabric" means a fabric which is used as a raw material for a reinforcing material to improve the strength of an ion exchange membrane. In the present specification, the "reinforcing fabric" is formed by weaving reinforcing yarns and sacrificial yarns. Reinforcing yarns and sacrificial yarns of the reinforcing fabric are woven as warps and wefts, respectively, and these warps and wefts are orthogonal in the case of a usual weaving method such as plain weaving.

A "reinforcing material" is a material which is used to improve the strength of an ion exchange membrane, and means a material formed of reinforcing yarns and optionally contained sacrificial yarns derived from the reinforcing fabric, which is formed in the process for producing an ion exchange membrane, by immersing a reinforcing precursor membrane made of a fluoropolymer having a reinforcing fabric embedded therein, in an aqueous alkaline solution, so that at least a portion of the sacrificial yarns of the reinforcing fabric is eluted. When a portion of the sacrificial yarns is dissolved, the reinforcing material will be composed of the reinforcing yarns and dissolution residues of the sacrificial yarns, and when all of the sacrificial yarns are dissolved, the reinforcing yarns will be composed solely of the reinforcing yarns. That is, the reinforcing material is a material formed of reinforcing yarns and optionally contained sacrificial yarns. The reinforcing material is embedded in an ion exchange membrane, and will be formed by immersing a reinforcing precursor membrane made of a fluoropolymer having a reinforcing fabric embedded therein, in an aqueous alkaline solution.

Reinforcing yarns constituting the reinforcing material are derived from a reinforcing fabric and are thus comprised of warps and wefts. These warps and wefts are usually orthogonal and are, respectively, present in parallel to the MD direction and the TD direction of the ion exchange membrane.

Here, the MD (Machine Direction) is a direction in which, in the production of an ion exchange membrane, a precursor membrane, a reinforcing precursor membrane and an ion exchange membrane are conveyed. The TD (Transverse Direction) is a direction perpendicular to the MD direction.

A "sacrificial yarn" is a yarn constituting a reinforcing fabric and means a yarn made of a material which will elute in an aqueous sodium hydroxide solution (e.g. an aqueous solution with a concentration of 32 mass %), when the reinforcing fabric is immersed therein. One sacrificial yarn may be a monofilament consisting of one filament or may be a multifilament composed of two or more filaments. In a case where a sacrificial yarn is a multifilament, an assembly of two or more filaments constitutes one sacrificial yarn. A sacrificial yarn will form an elution hole, as at least a portion thereof is eluted when a reinforcing precursor membrane made of a fluoropolymer having a reinforcing fabric embedded therein is immersed in an alkaline aqueous solution. When a portion of a sacrificial yarn is eluted, the rest of the sacrificial yarn will remain undissolved in the elution hole.

An "elution hole" means a hole to be formed as a result of elution of one sacrificial yarn when the yarn is immersed in an aqueous sodium hydroxide solution (e.g. an aqueous solution with a concentration of 32 mass %). In a case where the one sacrificial yarn is a monofilament, at least a portion of the material of the monofilament will be eluted, whereby one hole will be formed in the ion exchange membrane. In a case where one sacrificial yarn is a multifilament, at least a portion of the multifilament will be eluted, whereby a collection of a plurality of holes will be formed in the ion exchange membrane, and this collection of a plurality of holes is one elution hole.

A "reinforcing yarn" is a yarn constituting a reinforcing fabric and means a yarn made of a material which will not be eluted even if immersed in an aqueous sodium hydroxide solution (e.g. an aqueous solution with a concentration of 32 mass %). Even after immersing a reinforcing precursor membrane made of a fluoropolymer having a reinforcing fabric embedded therein, in an alkaline aqueous solution, whereby the sacrificial yarns are eluted from the reinforcing fabric, it remains undissolved as a yarn constituting the reinforcing material and maintains the mechanical strength and dimensional stability of the ion exchange membrane for alkali chloride electrolysis.

A "center of a reinforcing yarn" means the center in the width direction of a reinforcing yarn in a cross section perpendicular to the length direction of the reinforcing yarns of an ion exchange membrane.

A "center of an elution hole" means the center in the width direction of an elution hole in a cross section perpendicular to the length direction of the reinforcing yarns of an ion exchange membrane. In a case where a sacrificial yarn is a monofilament, the center of the sacrificial yarn before elution and the center of the elution hole will coincide with each other. In a case where the sacrificial yarn is a multifilament, the center of an elution hole is meant for an intermediate point, in the above-mentioned cross section, between the one end of holes and the other end of holes in the width direction.

An "aperture ratio" means a ratio of the area of the portion excluding the reinforcing yarns, to the area in the surface direction of the reinforcing material.

A "reinforcing precursor membrane" means a membrane having a reinforcing fabric composed of reinforcing yarns and sacrificial yarns embedded in a precursor membrane comprising a fluoropolymer having groups convertible to ion exchange groups. It is preferred that two precursor membranes comprising a fluoropolymer having groups convertible to ion exchange groups, are prepared, and a reinforcing fabric is laminated between the two precursor membranes.

A "precursor membrane" means a membrane comprising a fluoropolymer having groups convertible to ion exchange groups. It may be a membrane composed of a single layer of a fluoropolymer having groups convertible to ion exchange groups, or it may be a membrane composed of a plurality of such layers.

Hereinafter, an ion exchange membrane of the present invention will be described with reference to FIG. 1, but the present invention is not limited to the contents of FIG. 1.

<Ion Exchange Membrane for Alkali Chloride Electrolysis>

The ion exchange membrane for alkali chloride electrolysis of the present invention comprises a fluoropolymer having ion exchange groups, a reinforcing material formed of reinforcing yarns and optionally contained sacrificial yarns, present in a state of being embedded in said fluoropolymer, and elution holes formed by elution of said sacrificial yarns present between said reinforcing yarns.

Figure 1:
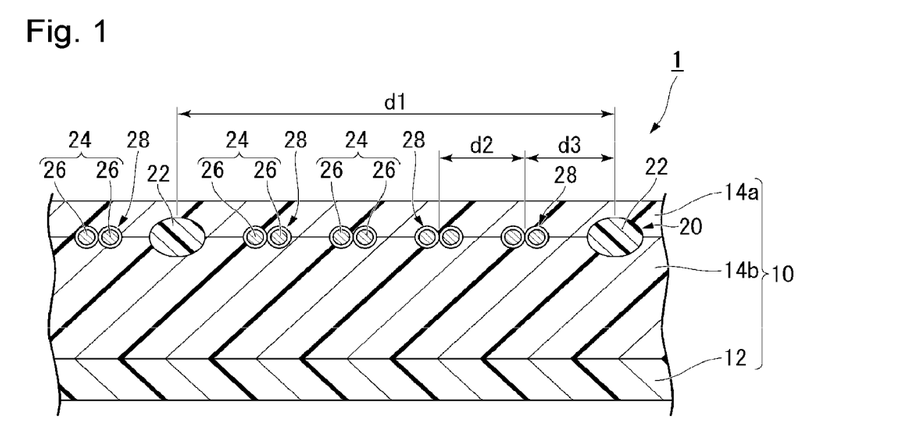
FIG. 1 is a cross-sectional view showing one example of the ion exchange membrane for alkali chloride electrolysis of the present invention.
Figure 2:
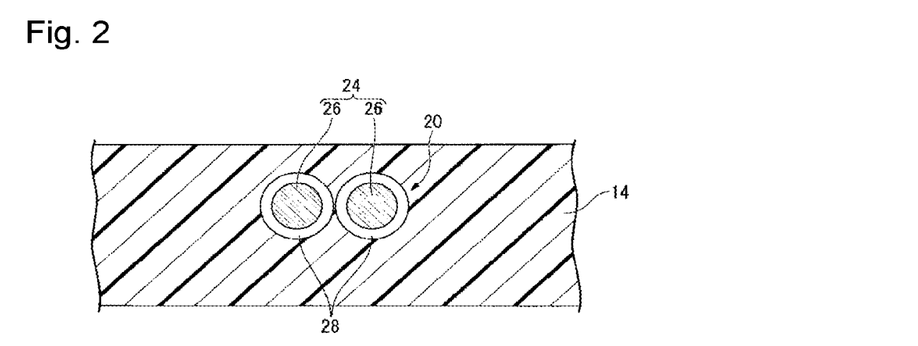
FIG. 2 is an enlarged cross-sectional view of the vicinity of the surface of the layer of the fluoropolymer having sulfonic acid functional groups, in the ion exchange membrane of alkali chloride electrolysis in FIG. 1.

FIG. 1 is a cross-sectional view showing one example of the ion exchange membrane for alkali chloride electrolysis of the present invention.

The ion exchange membrane 1 for alkali chloride electrolysis (hereinafter referred to as "ion exchange membrane 1") is one having an electrolyte membrane 10 comprising a fluoropolymer having ion exchange groups, reinforced by a reinforcing material 20.

[Electrolyte Membrane]

The electrolyte membrane 10 is a laminate comprising a layer 12 made of a fluoropolymer having carboxylic acid functional groups, as a functional layer exhibiting high current efficiency, and a layer 14a and layer 14b made of a fluoropolymer having sulfonic acid functional groups, to maintain the mechanical strength.

(Layer 12 Made of Fluoropolymer Having Carboxylic Acid Functional Groups)

As the layer 12 (hereinafter referred to also as "layer (C)") made of a fluoropolymer having carboxylic acid functional groups (hereinafter referred to also as "fluoropolymer (C)"), for example, a layer made of a copolymer comprising units derived from a fluoromonomer having a carboxylic acid functional group and units derived from a fluoro-olefin, may be mentioned.

The fluoropolymer (C) is preferably obtained by converting a fluoropolymer having groups convertible to carboxylic acid functional groups as described later (hereinafter referred to also as "fluoropolymer (C')") in a step (b) described below, to one having carboxylic acid functional groups.

The layer (C) usually has a membrane form. The thickness of the layer (C) is preferably from 5 to 50 μm, more preferably from 10 to 35 μm. When the thickness of the layer (C) is at least the above lower limit value, a high current efficiency is likely to be expressed. Further, in a case where electrolysis of sodium chloride is conducted, it is possible to reduce the amount of sodium chloride in sodium hydroxide as the product. When the thickness of the layer (C) is at most the above upper limit value, the membrane resistance of the ion exchange membrane 1 is suppressed to be low, and the electrolysis voltage is likely to be low.

(Layer 14a and Layer 14b Made of Fluoropolymer Having Sulfonic Acid Functional Groups)

As a layer 14a (hereinafter referred to also as "layer (Sa)") and a layer 14b (hereinafter referred to also as "layer (Sb)") made of a fluoropolymer having sulfonic acid functional groups (hereinafter referred to also as "fluoropolymer (S)"), layers made of a copolymer comprising units derived from a fluoromonomer having a sulfonic acid functional group and units derived from a fluoro-olefin, may be mentioned.

The fluoropolymer (S) is preferably obtained by converting, in a step (b) as described below, groups convertible to sulfonic acid groups in a fluoropolymer having groups convertible to sulfonic acid functional groups (hereinafter referred to also as "fluoropolymer (S')", to sulfonic acid functional groups.

FIG. 1 shows a state wherein a reinforcing material 20 is embedded between the layer (Sa) and the layer (Sb) (hereinafter the layer (Sa) and layer (Sb) will be collectively referred to also as "layer (S)"). In a laminated structure of two layers (Sa) and (Sb), the reinforcing material 20 is embedded between the two layers and as a result, is embedded in the layer (S).

In FIG. 1, the layer (Sa) and the layer (Sb) are each a single layer, but each of them may be formed of a plurality of layers.

The thickness of the layer (Sb) is preferably from 30 to 140 μm, more preferably from 30 to 100 μm. When the thickness of the layer (Sb) is at least the lower limit value, the mechanical strength of the ion exchange membrane 1 will be sufficiently high. When the thickness of the layer (Sb) is at most the upper limit value, membrane resistance of the ion exchange membrane 1 will be suppressed to be sufficiently low, and increase of the electrolysis voltage will be sufficiently suppressed.

The thickness of the layer (Sa) is preferably from 10 to 60 μm, more preferably from 10 to 40 μm. When the thickness of the layer (Sa) is at least the lower limit value, the reinforcing material 20 fits into the electrolyte membrane 10 thereby to improve peeling resistance of the reinforcing material 20. Further, the reinforcing material 20 will not be too close to the surface of the electrolyte membrane 10, whereby cracking is less likely to enter the surface of the electrolyte membrane 10, and as a result, lowering of the mechanical strength can be prevented. When the thickness of the layer (Sa) is at most the upper limit value, the membrane resistance of the ion exchange membrane 1 will be suppressed to be sufficiently low, and increase of the electrolysis voltage will be sufficiently suppressed.

(Reinforcing Material)

The reinforcing material 20 is a material for reinforcing the electrolyte membrane 10 and is a material derived from a reinforcing fabric woven with reinforcing yarns 22 and sacrificial yarns 24.

In the ion exchange membrane of the present invention, in order to secure the effect of the present invention, it is important that in a cross section perpendicular to the length direction of the reinforcing yarns forming the reinforcing material, the average distance between reinforcing yarns, the number of elution holes, and the total area of the sum of the cross-sectional area of an elution hole and the cross-sectional area of a sacrificial yarn remaining undissolved in the elution hole, are in specific ranges.

That is, in the ion exchange membrane of the present invention, in a cross section perpendicular to the length direction of the reinforcing yarns of the ion exchange membrane 1, the average distance (d1) from the center of a reinforcing yarn 22 to the center of the adjacent reinforcing yarn 22 is from 750 to 1,000 μm, preferably from 800 to 1,000 μm, more preferably from 800 to 930 μm, particularly preferably from 800 to 900 μm. When the average distance (d1) is within this range, it is possible to reduce the electrolysis voltage during alkali chloride electrolysis, while increasing the membrane strength. Further, when the average distance (d1) is at least the lower limit value, it is easy to reduce the electrolysis voltage during alkali chloride electrolysis. When the average distance (d1) is at most the upper limit value, it is easy to increase the membrane strength of the ion exchange membrane 1.

The average distance (d1) is a value measured in a cross section in the length direction of the reinforcing yarns of the ion exchange membrane, and means an average value of measured values of the distance from the center of a reinforcing yarn to the center of the adjacent reinforcing yarn in each of the MD cross section (cross section cut perpendicular to the MD direction) perpendicular to the length direction of the warps of the reinforcing yarns and the TD cross section (cross section cut perpendicular to the TD direction) perpendicular to the length direction of the weft yarns. The average value in the present invention is an average value of the measured values of distances measured at 10 points randomly selected in each cross section, and the same applies to values other than d1.

In the present invention, it is preferred that the above-mentioned distance from the center of a reinforcing yarn to the center of the adjacent reinforcing yarn in the reinforcing yarns of the ion exchange membrane, is within the above range at all the measurement points. It becomes thereby easy to obtain the effect to reduce the electrolysis voltage during the alkali chloride electrolysis, while increasing the membrane strength of the ion exchange membrane. All measurement points are meant for all points measured at random in order to calculate the average value. The same applies to values other than d1.

The density (the number of implantation) of reinforcing yarns 22 in the reinforcing fabric in order to form the reinforcing material 20 is preferably from 22 to 33 yarns/inch, more preferably from 25 to 30 yarns/inch. When the density of the reinforcing yarns 22 is at least the above lower limit value, the mechanical strength as a reinforcing material will be sufficiently high. When the density of the reinforcing yarns 22 is at most the upper limit value, the membrane resistance of the ion exchange membrane 1 can be suppressed to be sufficiently low, and increase of the electrolysis voltage can be sufficiently suppressed.

The density of sacrificial yarns 24 in the reinforcing fabric in order to form the reinforcing material is preferably an even multiple of the density of the reinforcing yarns 22. Specifically, the density of sacrificial yarns 24 is preferably four times or six times the density of the reinforcing yarns 22. When it is an even multiple, the warp and weft reinforcing yarns 22 cross vertically alternately, so that the reinforcing material after elution of the sacrificial yarns 24 will form a fabric texture.

The total density of the reinforcing yarns 22 and the sacrificial yarns 24 in the reinforcing fabric is preferably from 110 to 198 yarns/inch, from the viewpoint of easiness of weaving and less likeliness of misalignment.

The aperture ratio of the reinforcing material is preferably from 60 to 90%, more preferably from 65 to 85%, further preferably from 70 to 85%, particularly preferably from 70 to 80%. When the aperture ratio of the reinforcing material is at least the lower limit value, the membrane resistance of the ion exchange membrane 1 can be suppressed to be sufficiently low, and increase of the electrolysis voltage can be sufficiently suppressed. When the aperture ratio of the reinforcing material is at most the upper limit value, the mechanical strength as a reinforcing material will be sufficiently high.

The aperture ratio of the reinforcing material can be determined from an optical photomicrograph.

The thickness of the reinforcing material 20 is preferably from 40 to 160 μm, more preferably from 60 to 150 μm, particularly preferably from 70 to 140 μm, especially preferably from 80 to 130 μm. When the thickness of the reinforcing material 20 is at least the lower limit value, the mechanical strength as a reinforcing material will be sufficiently high. When the thickness of the reinforcing member 20 is at most the upper limit value, the thickness at the yarn intersections can be suppressed, and it is possible to sufficiently suppress the influence to raise the electrolysis voltage due to current shielding by the reinforcing material 20.

Since the reinforcing material is derived from a reinforcing fabric, the thickness of the reinforcing fabric is equal to the thickness of the reinforcing material. The preferred range of the thickness of the reinforcing fabric is also the same as the reinforcing material.

The reinforcing yarns 22 are preferably ones having durability against high temperature conditions in the alkali chloride electrolysis, as well as against chlorine, sodium hypochlorite and sodium hydroxide. As the reinforcing yarns 22, from the viewpoint of mechanical strength, heat resistance and chemical resistance, yarns having a fluoropolymer employed as a part or whole of the material, are preferred; yarns comprising a polymer with a fluorine content as high as possible, are more preferred; yarns comprising a perfluorocarbon polymer are further preferred; yarns comprising PTFE are further more preferred; and PTFE yarns composed solely of PTFE are especially preferred.

The reinforcing yarns 22 may be monofilaments or may be multifilaments. In a case where the reinforcing yarns 22 are PTFE yarns, from such a viewpoint that spinning is easy, monofilaments are preferred, and tape yarns obtained by slitting a PTFE film are more preferred.

The fineness of the reinforcing yarns 22 is preferably from 50 to 200 denier, more preferably from 80 to 150 denier. When the fineness of the reinforcing yarns 22 is at least the lower limit value, the mechanical strength will be sufficiently high. When the fineness of the reinforcing yarns 22 is at most the upper limit value, the membrane resistance of the ion exchange membrane 1 can be suppressed sufficiently low, and increase of the electrolysis voltage can be sufficiently suppressed. Further, the reinforcing yarns 22 will be less likely to be too close to the surface of the electrolyte membrane 10, whereby cracking is less likely to enter the surface of the electrolyte membrane 10, and as a result, lowering of the mechanical strength can be prevented.

The width of the reinforcing yarns 22 as viewed from a direction perpendicular to the fabric face of the reinforcing material 20 is from 70 to 160 µm, preferably from 90 to 150 µm, more preferably from 100 to 130 µm. When the width of the reinforcing yarns 22 is at least the above lower limit value, the membrane strength of the ion exchange membrane 1 tends to be high. When the width of the reinforcing yarns 22 is at most the upper limit value, it is easy to lower the membrane resistance of the ion exchange membrane 1, and easy to prevent increase in the electrolysis voltage.

The sacrificial yarns 24 will form elution holes as at least a portion of the material is eluted in an alkaline aqueous solution in the following step (i) for producing an ion exchange membrane. The ion exchange membrane obtained via the step (i) is then placed in an electrolytic cell, and prior to the main operation of alkali chloride electrolysis, a conditioning operation of the following step (ii) is carried out. Even in a case where sacrificial yarns 24 remaining undissolved in step (i) are present, in the step (ii), the majority or preferably the entirety of the remaining material of the sacrificial yarns 24 is eluted and removed in the alkaline aqueous solution.

Here, the ion exchange membrane for alkali chloride electrolysis of the present invention is a membrane produced via the step (i) and disposed in an electrolytic cell in the step (ii), and is not a membrane after the conditioning operation in the step (ii).

Step (i): a step of immersing a reinforcing precursor membrane having a reinforcing fabric embedded in a fluoropolymer having groups convertible to ion exchange groups, in an alkaline aqueous solution, to convert the fluoropolymer having groups convertible to ion exchange groups, to a fluoropolymer having ion exchange groups.

Step (ii): a step of disposing the ion exchange membrane obtained via the step (i) in an electrolytic cell and carrying out a conditioning operation before the main operation of alkali chloride electrolysis.

As the sacrificial yarns 24, preferred are yarns comprising at least one member selected from the group consisting of PET, polybutylene terephthalate (hereinafter referred to as PBT), polytrimethylene terephthalate (hereinafter referred to as PTT), rayon and cellulose, and more preferred are PET yarns composed solely of PET, PET/PBT yarns composed of a mixture of PET and PBT, PBT yarns composed solely of PBT, or PTT yarns composed solely of PTT.

As the sacrificial yarns 24, from the viewpoint of cost, PET yarns are preferred. As the sacrificial yarns 24, preferred are yarns which will be hardly eluted in an aqueous alkaline solution during the step (i), whereby part of the sacrificial yarns will remain so that it is possible to obtain an ion-exchange membrane 1 having sufficiently high mechanical strength. As such sacrificial yarns, PBT yarns or PTT yarns are preferred, and PTT yarns are particularly preferred. As the sacrificial yarns 24, from the viewpoint of the balance between costs and the mechanical strength of the ion exchange membrane 1, PET/PBT yarns are preferred.

A sacrificial yarn 24 may be a multifilament having two filaments 26 gathered as shown in FIG. 1, or may be a monofilament. When the sacrificial yarn 24 is a multifilament, the contact area with the alkaline aqueous solution becomes wider, and in the step (ii), such a sacrificial yarn 24 will be easily eluted in an alkaline aqueous solution, and thus, a multifilament is preferred.

In a case where a sacrificial yarn 24 is a multifilament, the number of filaments 26 per one sacrificial yarn 24 is preferably from 2 to 32, more preferably from 2 to 16, further preferably from 2 to 8. When the number of filaments 26 is at least the above lower limit value, during the step (ii), a sacrificial yarn 24 will be easily eluted in the alkaline aqueous solution. When the number of filaments 26 is at most the above upper limit value, during the step (i), such a sacrificial yarn will be hardly eluted in the alkaline aqueous solution, and part of the sacrificial yarn will remain, whereby an ion-exchange membrane 1 having sufficiently high mechanical strength will be obtainable.

The fineness of the sacrificial yarns 24 is preferably from 7 to 100 denier, more preferably from 9 to 60 denier, further preferably from 12 to 40 denier, prior to elution of the sacrificial yarns 24 in the step (i), i.e. at the stage where the sacrificial yarns have the same thickness as the sacrificial yarns of a reinforcing fabric. When the fineness of the sacrificial yarns 24 is at least the above lower limit value, the mechanical strength will be sufficiently high, and, at the same time, weaving properties will be sufficiently high. When the fineness of the sacrificial yarns 24 is at most the above upper limit value, holes to be formed after the sacrificial yarns 24 are eluted, are less likely to be too close to the surface of the electrolyte membrane 10, and cracking is less likely to occur at the surface of the electrolyte membrane 10, whereby deterioration in the mechanical strength can be avoided.

(Elution Holes)

The ion exchange membrane 1 has, in the layer (S) (14a and 14b) of the electrolyte membrane 10, elution holes 28 formed by elution of at least a portion of the sacrificial yarns 24 during the step (i). As shown in FIG. 1, in a case where a sacrificial yarn 24 is a multifilament composed of two filaments, at least a portion of the material of the multifilament will be eluted to form an elution hole consisting of a collection of two holes. In a case where a sacrificial yarn 24 is made of a monofilament, at least a portion of the material of the monofilament will be eluted to form an elution hole. In a case where in the step (i), a portion of the sacrificial yarn 24 has remained without being eluted, the remaining sacrifice yarn is present in the elution hole.

In the ion exchange membrane 1, it is preferred that even after the step (i), a portion of the sacrificial yarns 24 remains, and elution holes 28 are formed around filaments 26 of the sacrificial yarns 24. Thereby, breakage such as cracking is less likely to occur in the ion exchange membrane 1, at the time of handling the ion exchange membrane 1 after the production of the ion exchange membrane 1 and before the conditioning operation of the alkali chloride electrolysis, or at the time of installation of the ion exchange membrane 1 in the electrolytic cell at the time of the conditioning operation.

Even if a portion of sacrificial yarns 24 remains after the step (i), during the step (ii), the sacrificial yarns 24 will be eluted in the alkaline aqueous solution, and the majority, preferably the entirety, of them will be removed, so that at the time of the main operation of the alkali chloride electrolysis using the ion exchange membrane 1, they present no influence over the membrane resistance. After the installation of the ion exchange membrane 1 in the electrolytic cell, there will be no large force to be exerted from outside to the ion exchange membrane 1, and therefore, even if the sacrificial yarns 24 have been completely eluted and removed in the alkaline aqueous solution, it is less likely that breakage such as cracking occurs in the ion exchange membrane.

Otherwise, the sacrificial yarns may be eluted in the entirety of sacrificial yarns 24 in the step (i).

In a cross section perpendicular to the length direction of the reinforcing yarns of the ion exchange membrane 1, the total area (S) obtained by adding the cross-sectional area of an elution hole 28 and the cross-sectional area of a sacrificial yarn 24 remaining undissolved in the elution hole 28, is from 500 to 5,000 $\mu m^2$, preferably from 1,000 to 5,000 $\mu m^2$, more preferably from 1,000 to 4,000 $\mu m^2$, particularly preferably from 1,000 to 3,000 $\mu m^2$, per elution hole. In a case where the sacrificial yarns are completely eluted, the total area (S) becomes a cross-sectional area of only the elution hole. That is, the total area (S) obtained by adding the cross-sectional areas, becomes to be almost equal to the total area of the cross-sectional area of one sacrificial yarn in the reinforcing fabric. In a case where a sacrificial yarn is a monofilament, the total area (S) becomes the cross-sectional area of the elution hole formed from one filament, and in a case where a sacrificial yarn is a multifilament composed of two or more filaments, the total area (S) becomes the sum of the cross-sectional areas of elution holes formed from the respective filaments constituting the multifilament.

When the total area (S) is at least the above lower limit value, it is possible to prepare a reinforcing fabric without causing yarn breakage of the sacrificial yarns during weaving, and, in the obtained ion exchange membrane, it is possible to reduce the electrolysis voltage during the alkali chloride electrolysis. When the total area (S) is at most the above upper limit value, it is possible to fit the sacrificial yarns between the reinforcing yarns during weaving of the reinforcing fabric, and it is possible to reduce the electrolysis voltage during the alkali chloride electrolysis.

The total area (S) is measured by using an imaging software by observing the cross section of the ion exchange membrane dried at 90° C. over 2 hours, by an optical electron microscope.

In the present invention, in a cross section perpendicular to the length direction of the reinforcing yarns forming a reinforcing material, the total area (S) is in the above range. A cross section perpendicular to the length direction of the reinforcing yarns means at least one cross section selected from a cross section (hereinafter referred to as "MD cross section") cut perpendicular to the MD direction and a cross section (hereinafter referred to as "TD cross section") cut perpendicular to the TD direction, of the ion exchange membrane. That is, at least one of the total area (S) of the total area (S) in the TD cross section and the total area (S) in the MD cross section, is in the above range.

Further, the MD cross-section of the ion-exchange membrane in the present invention is preferably a cross section which does not overlap with the reinforcing yarns, the sacrificial yarns and the elution holes, disposed perpendicularly to the MD direction in the reinforcing material embedded in the ion exchange membrane. The same applies to the TD cross section.

The total area (S) in the cross section of the present invention is more preferably such that the average value of the total area (S) in the MD cross section and the total area (S) in the TD cross section, is within the above range, further preferably such that both of the total area (S) in the MD cross section and the total area (S) in the TD cross section are within the above range.

The total area (S) in the MD cross section can be obtained by measuring the total area (S) with respect to elution holes at 10 locations randomly selected in the MD cross section of an ion exchange, and obtaining the average value thereof. The total area (S) in the TD cross section can be obtained also in the same manner.

In an ion exchange membrane, in a case where a sacrificial yarn is completely dissolved, the total area (S) is the cross-sectional area of the elution hole, and in a case where a sacrificial yarn remaining undissolved is present in an elution hole, the total area (S) is a total area obtained by adding the cross-sectional area of the elution hole and the cross-sectional area of the sacrificial yarn remaining undissolved.

In a cross section perpendicular to the length direction of the reinforcing yarns of the ion exchange membrane 1, the number n of elution holes 28 between adjacent reinforcing yarns 22 is from 4 to 6, particularly preferably 4. When the number n of elution holes 28 is from 4 to 6, it is possible to reduce the electrolysis voltage during the alkaline chloride electrolysis, while increasing the membrane strength.

Here, an elution hole formed from one sacrificial yarn made of a multifilament is counted as 1. FIG. 1 shows an example wherein the number n of elution holes 28 formed from sacrificial yarns 24 between adjacent reinforcing yarns 22 is 4.

The ion-exchange membrane of the present invention is a membrane in which the distances of reinforcing yarns and elution holes are within the above ranges, and the distance of elution holes is within the above range, but it is particularly preferably an ion exchange membrane having a structure wherein the distances of reinforcing yarns and elution holes, and the number of elution holes are in a relationship satisfying certain conditions, i.e. a structure wherein the distance of reinforcing yarns, and the number and distance of elution holes have a certain regularity.

That is, with respect to the distance of elution holes in the ion exchange membrane of the present invention, the average distance (d2) from the center of an elution hole 28 to the center of the adjacent elution hole 28 in a cross section perpendicular to the length direction of the reinforcing yarns of the ion-exchange membrane 1, preferably satisfies the following relation (1), more preferably satisfies the following relation (1-1), further preferably satisfies the following formula (1-2). Thereby, it becomes easy to obtain the effect of reducing the electrolysis voltage during the alkali chloride electrolysis while increasing the membrane strength.

$$0.5 \leq \{d2/d1 \times (n+1)\} \leq 1.5 \quad (1)$$

$$0.7 \leq \{d2/d1 \times (n+1)\} \leq 1.4 \quad (1\text{-}1)$$

$$0.8 \leq \{d2/d1 \times (n+1)\} \leq 1.2 \quad (1\text{-}2)$$

wherein d1: the average distance from the center of a reinforcing yarn to the center of the adjacent reinforcing yarn, d2: the average distance from the center of an elution hole to the center of the adjacent elution hole, n: number of elution holes between adjacent reinforcing yarns.

In the present invention, in a cross section perpendicular to the length direction of the reinforcing yarns, it is preferred that the average distance (d1) and the average distance (d2) satisfy the relationships of the above formulas. A cross section perpendicular to the length direction of the reinforcing yarns means at least one cross section selected from the MD cross section and the TD cross section of the ion exchange membrane. That is, the average distance (d1) and the average distance (d2) in at least one cross section selected from the MD cross section and the TD cross section preferably satisfy the relationships of the above formulas.

In the present invention, it is preferred that an average value of the average distance (d1) in the MD cross section and the average distance (d1) in the TD cross section, and an average value of the average distance (d2) in the MD cross section and the average distance (d2) in the TD cross section, satisfy the above formulas, and it is more preferred that in both the MD cross section and the TD cross section, the average distance (d1) and the average distance (d2) satisfy the relationships of the above formulas.

The values of the average distance (d1) and the average distance (d2) in the MD cross section, are obtainable by measuring, in the MD cross section of the ion exchange membrane, the average distance (d1) and the average distance (d2), respectively, at 10 locations randomly selected, and obtaining the respective average values. The average distance (d1) and the average distance (d2) in the TD cross section are obtainable in the same manner.

In the present invention, in a cross section perpendicular to the length direction of the reinforcing yarns of the ion exchange membrane, the distance d2' from the center of an elution hole to the center of the adjacent elution hole, preferably satisfies the relation of the following formula (1'), more preferably satisfies the relation of the following formula (1'-1), further preferably satisfies the relation of the following formula (1'-2), particularly preferably satisfies the relation of the following formula (1'-3), at all of the measurement points measured to determine the average distance (d2). Thereby, it becomes easy to obtain the effect of reducing the electrolysis voltage during the alkali chloride electrolysis, while increasing the membrane strength. Here, in the distance d2', all of the measurement points measured to determine the average distance (d2) mean all of the measurement points measured to calculate the average distance (d2). Specifically, in the MD cross section or the TD cross section, all of the measurement points mean the measurement points at 10 locations measured to obtain the average distance (d2).

$$0.4 \leq \{d2'/d1 \times (n+1)\} \leq 1.6 \quad (1')$$

$$0.5 \leq \{d2'/d1 \times (n+1)\} \leq 1.5 \quad (1'\text{-}1)$$

$$0.7 \leq \{d2'/d1 \times (n+1)\} \leq 1.4 \quad (1'\text{-}2)$$

$$0.8 \leq \{d2'/d1 \times (n+1)\} \leq 1.2 \quad (1'\text{-}3)$$

Further, with respect to the distance between a reinforcing yarn and an elution hole in the ion exchange membrane of the present invention, in a cross section perpendicular to the length direction of the reinforcing yarns of the ion exchange membrane 1, an average distance (d3) from the center of a reinforcing yarn 22 to the center of the adjacent elution hole 28 preferably satisfies the relation of the following formula (2), more preferably satisfies the relation of the following formula (2-1), further preferably satisfies the relation of the following formula (2-2). Thereby, it becomes easy to obtain the effect of reducing the electrolysis voltage during the alkali chloride electrolysis, while increasing the membrane strength.

$$0.5 \leq \{d3/d1 \times (n+1)\} \leq 1.5 \quad (2)$$

$$0.8 \leq \{d3/d1 \times (n+1)\} \leq 1.5 \quad (2\text{-}1)$$

$$0.9 \leq \{d3/d1 \times (n+1)\} \leq 1.4 \quad (2\text{-}2)$$

provided that the symbols in the formula (2) have the following meanings:

d3: the average distance from the center of a reinforcing yarn to the center of the adjacent elution hole.

d1 and n: the same as above.

Further, in the present invention, in a cross section perpendicular to the length direction of the reinforcing yarns, the average distance (d1) and the average distance (d3) preferably satisfy the relations of the above formulas. A cross section perpendicular to the length direction of the reinforcing yarns means at least one cross section of the MD cross section and the TD cross section of the ion exchange membrane. That is, the average distance (d1) and the average distance (d3) in at least one cross section selected from the MD cross section and the TD cross section preferably satisfy the relations of the above formulas.

In the present invention, it is preferred that an average value of the average distance (d1) in the MD cross section and the average distance (d1) in the TD cross section, and an average value of the average distance (d3) in the MD cross section and the average distance (d3) in the TD cross section, satisfy the above formulas, and it is more preferred that in both the MD cross section and the TD cross section, the average distance (d1) and the average distance (d3) satisfy the relations of the above formulas.

The values of the average distance (d1) and the average distance (d3) in the MD cross section are obtainable by measuring, in the MD cross section of the ion exchange membrane, the average distance (d1) and the average distance (d3) at 10 locations randomly selected, and obtaining the respective average values. The average distance (d1) and the average distance (d3) in the TD cross section are obtainable also in the same manner.

In the present invention, in a cross section perpendicular to the length direction of the reinforcing yarns of the ion exchange membrane, the distance d3' from the center of a reinforcing yarn to the center of the adjacent elution hole, preferably satisfies the relation of the following formula (2'), more preferably satisfies the relation of the following formula (2'-1), further preferably satisfies the relation of the following formula (2'-2), particularly preferably satisfies the relation of the following formula (2'-3), at all of the measurement points. Thereby, it becomes easy to obtain the effect of reducing the electrolysis voltage during the alkali chloride electrolysis, while increasing the membrane strength. Here, in the distance d3', all of the measurement points measured to determine the average distance (d3) mean all of the measurement points measured to calculate the average distance (d3). Specifically, in an optional MD cross section or TD cross section, they mean measurement points at 10 locations measured to obtain the average distance (d3).

$$0.4 \leq \{d3'/d1 \times (n+1)\} \leq 1.6 \quad (2')$$

$$0.5 \leq \{d3'/d1 \times (n+1)\} \leq 1.5 \quad (2'\text{-}1)$$

$$0.8 \leq \{d3'/d1 \times (n+1)\} \leq 1.5 \quad (2'\text{-}2)$$

$$0.9 \leq \{d3'/d1 \times (n+1)\} \leq 1.4 \quad (2'\text{-}3)$$

[Production Method]

The ion exchange membrane 1 in the present invention is preferably produced via the above step (i), and the step (i) preferably comprises the following steps (a) and (b).

Step (a): a step of obtaining a reinforcing precursor membrane by embedding a reinforcing fabric made of reinforcing yarns and sacrificial yarns, in a fluoropolymer having groups convertible to ion exchange groups, Step (b): a step of contacting the reinforcing precursor membrane obtained in the step (a) to an alkaline aqueous solution to convert the fluoropolymer having groups convertible to ion exchange groups, to a fluoropolymer having ion exchange groups and at the same time, to let at least a portion of the sacrificial yarns of the embedded reinforcing fabric, elute, thereby to obtain an ion exchange membrane 1 comprising a fluoropolymer having ion exchange groups, a reinforcing material having at least a portion of the sacrificial yarns in the reinforcing fabric eluted, and elution holes.

Here, in the step (b), after converting the groups convertible to ion exchange groups, to ion exchange groups, if necessary, salt exchange to replace the counter cation of the ion exchange groups may be carried out. In the salt exchange, the counter cation of the ion exchange group may be replaced, for example, from potassium to sodium.

(Step (a))

In the step (a), firstly, by a co-extrusion method, a laminated membrane having a layer (hereinafter referred to as layer (C')) made of a fluoropolymer having groups convertible to carboxylic acid functional groups, and a layer (hereinafter referred to as layer (S')) made of a fluoropolymer having groups convertible to sulfonic acid functional groups, is obtained. Further, separately, by a single layer extrusion process, a membrane (hereinafter referred to as membrane (S')) made of a layer (S') of a fluoropolymer having groups convertible to sulfonic acid functional groups, is obtained.

Then, the membrane (S'), a reinforcing fabric and the laminated membrane are disposed in this order and laminated by means of a laminating roll or vacuum laminating apparatus. At that time, the laminated membrane of the layer (S') and the layer (C') is disposed so that the layer (S') is in contact with the reinforcing fabric.

The fluoropolymer (C') to form the layer (C') may, for example, be a copolymer having units derived from a fluoromonomer (hereinafter referred to as fluoromonomer (C')) having a group convertible to a carboxylic acid functional group and units derived from a fluorinated olefin.

The fluoromonomer (C') is not particularly limited so long as it is a compound having one or more fluorine atoms in the molecule, an ethylenic double bond, and a group convertible to a carboxylic acid functional group, and it is possible to use a conventional one.

As the fluoromonomer (C'), a fluorovinyl ether represented by the following formula (3) is preferred from the viewpoint of the production cost of the monomer, the reactivity with other monomers and excellent properties of the obtainable fluoropolymer.

$$CF_2=CF-(O)_p-(CF_2)_q-(CF_2CFX)_r-(O)_s-(CF_2)_t-(CF_2CFX')_u-A^1 \quad (3)$$

In the formula (3), X is a fluorine atom or a trifluoromethyl group. X' is a fluorine atom or a trifluoromethyl group. X and X' in the formula (3) may be the same or different.

$A^1$ is a group convertible to a carboxylic acid functional group. The group convertible to a carboxylic acid functional group is a functional group which can be converted to a carboxylic acid functional group by hydrolysis treatment or acid form treatment, and may, for example, be —CN, —COF, —COOR$^1$ (wherein R$^1$ is a $C_{1\text{-}10}$ alkyl group), —COONR$^2$R$^3$ (wherein R$^2$ and R$^3$ are each a hydrogen atom or a $C_{1\text{-}10}$ alkyl group, and R$^2$ and R$^3$ may be the same or different), etc.

p is 0 or 1, q is an integer from 0 to 12, r is an integer of from 0 to 3, s is 0 or 1, t is an integer from 0 to 12, and u is an integer of from 0 to 3. However, p and s are not 0 at the same time, and r and u are not 0 at the same time. That is, $1 \leq p+s$, and $1 \leq r+u$.

As specific examples of the fluorovinyl ether of the formula (3), the following compounds may be mentioned, and, from the viewpoint of easy production, a compound wherein p=1, q=0, r=1, s=0 to 1, t=1 to 3 and u=0 to 1, is preferred.

$CF_2=CF-O-CF_2CF_2-COOCH_3$,
$CF_2=CF-O-CF_2CF_2-CF_2-COOCH_3$,
$CF_2=CF-O-CF_2CF_2-CF_2CF_2-COOCH_3$,
$CF_2=CF-O-CF_2CF_2-O-CF_2CF_2-COOCH_3$,
$CF_2=CF-O-CF_2CF_2-O-CF_2CF_2-CF_2-COOCH_3$,
$CF_2=CF-O-CF_2CF_2-O-CF_2CF_2-CF_2CF_2-COOCH_3$,
$CF_2=CF-O-CF_2-CF_2CF_2-O-CF_2CF_2-COOCH_3$,
$CF_2=CF-O-CF_2CF(CF_3)-O-CF_2CF_2-COOCH_3$,
$CF_2=CF-O-CF_2CF(CF_3)-O-CF_2-CF_2CF_2-COOCH_2$.

As the fluoromonomer (C'), one type may be used alone, or two or more types may be used in combination.

The fluorinated olefin may, for example, be a $C_{2\text{-}3}$ fluoroolefin having one or more fluorine atoms in the molecule. As such a fluoroolefin, tetrafluoroethylene ($CF_2=CF_2$) (hereinafter referred to as TFE), chlorotrifluoroethylene ($CF_2=CFCl$), vinylidene fluoride ($CF_2=CH_2$), vinyl fluoride ($CH_2=CHF$), hexafluoropropylene ($CF_2=CFCF_3$), etc. may be mentioned. Among them, TFE is particularly preferred from the viewpoint of the production cost of the monomer, the reactivity with other monomers and excellent properties of the obtainable fluoropolymer.

As the fluorinated olefin, one type may be used alone, or two or more types may be used in combination.

For the production of the fluoropolymer (C') to form the layer (C'), in addition to the fluoromonomer (C') and the fluorinated olefin, other monomers may further be used. Such other monomers may, for example, be $CF_2=CF-R^f$ (wherein $R^f$ is a perfluoroalkyl group having from 2 to 10 carbon atoms), $CF_2=CF-OR^{f1}$ (wherein $R^{f1}$ is a perfluoroalkyl group having from 1 to 10 carbon atoms), $CF_2=CFO(CF_2)_vCF=CF_2$ (wherein v is an integer of from 1 to 3), etc. By copolymerizing other monomers, it is possible to improve flexibility and mechanical strength of the ion exchange membrane 1. The proportion of other monomers is preferably at most 30 mass % in the total monomers (100 mass %), from the viewpoint of maintaining the ion exchange performance.

The ion exchange capacity of the fluoropolymer (C) is preferably from 0.5 to 2.0 meq/g dry resin. The ion exchange capacity is preferably at least 0.6 meq/g dry resin, more preferably at least 0.7 meq/g dry resin, from the viewpoint of mechanical strength and electrochemical performance as an ion exchange membrane.

In order to bring the ion exchange capacity of the fluoropolymer (C) to be within the above range, the content of units derived from a fluoromonomer (C') in the fluoropolymer (C') may be made so that the ion-exchange capacity of the fluoropolymer (C) will be within the above range after converting the groups to be convertible to carboxylic acid functional groups in the fluoropolymer (C') to carboxylic acid functional groups. The content of carboxylic acid functional groups in the fluoropolymer (C) is preferably the same as the content of the groups convertible to carboxylic acid functional groups in the fluoropolymer (C').

With respect to the molecular weight of the fluoropolymer (C'), from the viewpoint of mechanical strength and film-forming ability as an ion exchange membrane, the TQ value is preferably 150° C., more preferably from 170 to 340° C., further preferably from 170 to 300° C.

The TQ value is a value related to the molecular weight of a polymer, and is one represented by a temperature showing a volume flow rate: 100 mm³/sec. The volume flow rate is one obtained by letting a polymer be melted and flow out from an orifice (diameter: 1 mm, length: 1 mm) at a constant temperature under a pressure of 3 MPa and representing the amount of the flowing out polymer by a unit of mm³/sec. The TQ value serves as an index for the molecular weight of the polymer and indicates that the higher the TQ value, the higher the molecular weight.

The fluoropolymer having groups convertible to sulfonic acid functional groups to form the layer (S') may, for example, be a copolymer having units derived from a fluoromonomer having a group convertible to a sulfonic acid functional group (hereinafter referred to as a fluoromonomer (S') and units derived from a fluorinated olefin.

The fluoromonomer (S') is not particularly limited so long as it has one or more fluorine atoms in the molecule, an ethylenic double bond and a group convertible to a sulfonic acid functional group, and a conventional one may be employed.

As the fluoromonomer (S'), from the viewpoint of the production cost of the monomer, the reactivity with other monomers and excellent properties of the obtainable fluoropolymer, a compound represented by the following formula (4) or a compound represented by the following formula (5) is preferred.

$$CF_2=CF-O-R^{f2}-A^2 \qquad (4),$$

$$CF_2=CF-R^{f2}-A^2 \qquad (5).$$

$R^{f2}$ is a perfluoroalkylene group having from 1 to 20 carbon atoms, may contain an etheric oxygen atom, and may be straight-chained or branched.

$A^2$ is a group convertible to a sulfonic acid functional group. The group convertible to a sulfonic acid functional group is a functional group that can be converted to a sulfonic acid functional group by hydrolysis treatment or acid form treatment. The functional group that can be converted to a sulfonic acid functional group may, for example, be $-SO_2F$, $-SO_2Cl$, $-SO_2Br$, etc.

As the compound represented by the formula (4), the following compounds are specifically preferred.

$CF_2=CF-O-(CF_2)_a-SO_2F$ (wherein a is an integer of from 1 to 8), $CF_2=CF-O-CF_2CF(CF_3)O(CF_2)_a-SO_2F$ (wherein a is an integer of from 1 to 8), $CF_2=CF[OCF_2CF(CF_3)]_aSO_2F$ (wherein a is an integer of from 1 to 5).

As the compound represented by the formula (5), the following compounds are specifically preferred.

$CF_2=CF(CF_2)_b-SO_2F$ (wherein b is an integer of from 1 to 8), $CF_2=CF-CF_2-O-(CF_2)_b-SO_2F$ (wherein b is an integer of from 1 to 8).

As the fluoromonomer (S'), from such a viewpoint that industrial synthesis is easy, the following compounds are more preferred.

$CF_2=CFOCF_2CF_2SO_2F$,
$CF_2=CFOCF_2CF_2CF_2SO_2F$,
$CF_2=CFOCF_2CF_2CF_2CF_2SO_2F$,
$CF_2=CFOCF_2CF(CF_3)OCF_2CF_2SO_2F$,
$CF_2=CFOCF_2CF(CF_3)OCF_2CF_2CF_2SO_2F$,
$CF_2=CFOCF_2CF(CF_3)SO_2F$,
$CF_2=CFCF_2CF_2SO_2F$,
$CF_2=CFCF_2CF_2CF_2SO_2F$,
$CF_2=CF-CF_2-O-CF_2CF_2-SO_2F$.

As the fluoromonomer (S'), one type may be used alone, or two or more types may be used in combination.

The fluorinated olefin may be those exemplified above, and from the viewpoint of the production cost of the monomer, the reactivity with other monomers and excellent properties of the obtainable fluoropolymer, TFE is particularly preferred.

As the fluorinated olefin, one type may be used alone, or two or more types may be used in combination.

For the production of the fluoropolymer (S') to form the layer (S'), in addition to the fluoromonomer (S') and the fluorinated olefin, other monomers may further be used. Such other monomers may be those exemplified above. By copolymerizing other monomers, it is possible to improve flexibility and mechanical strength of the ion exchange membrane 1. The proportion of other monomers is preferably at most 30 mass % in all monomers (100 mass %), from the viewpoint of maintaining the ion exchange performance.

The ion exchange capacity of the fluoropolymer (S) is preferably from 0.5 to 2.0 meq/g dry resin. The ion exchange capacity is preferably at least 0.6 meq/g dry resin, more preferably at least 0.7 meq/g dry resin, from the viewpoint of mechanical strength and electrochemical performance as an ion exchange membrane.

In order to bring the ion exchange capacity of the fluoropolymer (S) to be within the above range, the content of units derived from a fluoromonomer (S') in the fluoropolymer (S') may be adjusted so that the ion exchange capacity of the fluoropolymer (S) will be within the above range, after converting the groups convertible to sulfonic acid functional groups in the fluoropolymer (S') to sulfonic acid functional groups. The content of sulfonic acid functional groups in the fluoropolymer (S) is preferably the same as the content of the groups convertible to sulfonic acid functional groups in the fluoropolymer (S').

With respect to the molecular weight of the fluoropolymer (S'), from the viewpoint of mechanical strength and membrane-forming ability as an ion exchange membrane, the TQ value is preferably at least 150° C., more preferably from 170 to 340° C., further preferably from 170 to 300° C.

(Step (b))

The reinforcing precursor membrane obtained in the above step (a) is subjected to hydrolysis treatment or acid form treatment to convert the groups convertible to carboxylic acid functional groups and the groups convertible to sulfonic acid functional groups, to carboxylic acid functional groups and sulfonic acid functional groups, respectively, thereby to obtain an ion exchange membrane 1. The method for hydrolysis may, for example, be preferably a method of using a mixture of a water-soluble organic compound and a hydroxide of an alkali metal, as described in e.g. JP-A-1-140987.

In the step (b), by contacting the reinforcing precursor membrane to an alkaline aqueous solution, at least a portion of sacrificial yarns 24 is eluted in the alkaline aqueous solution. The elution of sacrificial yarns 24 is preferably carried out by hydrolysis of the material constituting the sacrificial yarns.

Advantageous Effects

In a case where an ion exchange membrane is reinforced by a reinforcing material formed of reinforcing yarns and optionally contained sacrificial yarns, it is considered that the reinforcing yarns will prevent migration of cations such as sodium ions in the membrane, whereby the vicinity on the cathode side of the reinforcing yarns will be a region (hereinafter referred to as a current-shielding region) not substantially functioning as an electrolysis site. Therefore, if the density of the reinforcing yarns is increased by narrowing their spacing, the current-shielding region within the ion exchange membrane will be increased, whereby it is considered the membrane resistance will increase, and the electrolysis voltage becomes high.

Whereas, in the ion exchange membrane for alkali chloride electrolysis of the present invention, the above-mentioned average distance (d1), the total area (S) and the number n of elution holes, are controlled to be within the specific ranges, whereby even if the membrane strength is increased by narrowing the spacing of reinforcing yarns, the membrane resistance is kept low, and it is possible to reduce the electrolysis voltage at the time of alkali chloride electrolysis. This is considered to be as follows.

When the total area (S) is small, sodium ions, etc. tend to be difficult to pass through portions of elution holes in the vicinity of the reinforcing yarns, whereby the membrane resistance in the vicinity of the reinforcing yarns tends to be higher than when the total area (S) is large. On the other hand, at a portion apart from reinforcing yarns, the volume of elution holes is small as compared to when the total area (S) is large, whereby extra resistance will not increase, and the membrane resistance tends to be low. Further, when the above total area (S) is large, sodium ions, etc. tend to easily pass together with the salt water through elution holes in the vicinity of reinforcing yarns, and the current shielding region becomes smaller, whereby the membrane resistance in the vicinity of reinforcing yarns becomes low as compared to when the total area (S) is small. On the other hand, at a portion apart from reinforcing yarns, the volume of elution holes is larger than when the total area (S) is small, whereby extra resistance tends to increase, and the membrane resistance tends to increase. From the foregoing, in the present invention, it is important to control the total area (S) in the specific range.

Further, when the number n of elution holes is small, like in the case where the total area (S) is small, sodium ions, etc. tend to be difficult to pass in the vicinity of reinforcing yarns, and the membrane resistance in the vicinity of reinforcing yarns tend to be high as compared to when the number n of elution holes is large. On the other hand, at a portion apart from reinforcing yarns, the volume of elution holes is small, whereby extra resistance will not increase, and the membrane resistance tends to be low as compared to when the number n of elution holes is large. Further, when the above-described number n of elution holes is large, sodium ions, etc. tend to easily pass in the vicinity of reinforcing yarns, and the current shielding region becomes smaller, whereby the membrane resistance in the vicinity of reinforcing yarns tends to be low as compared to when the number n of elution holes is small. On the other hand, at a portion apart from reinforcing yarns, the volume of elution holes increases, whereby extra resistance will increase, and the membrane resistance becomes high as compared to when the number n of elution holes is small. From the foregoing, it is important to control the number (n) of elution holes to be within the specific range.

If the spacing of reinforcing yarns is made to be too narrow and the current shielded region within the ion exchange membrane becomes extremely large, the effects to reduce the membrane resistance by the total area (S) and the number n of elution holes tend to be relatively small. On the other hand, if the spacing of the reinforcing yarns is made to be too wide, and the current shielding region becomes extremely small, elution holes tend to be extra resistance, and the effect to reduce the electrolysis voltage tends to be relatively small. Therefore, it is important to control the spacing of reinforcing yarns to be within the specific range.

In the present invention, by controlling the above-described total area (S) and number n of elution holes within specific ranges, the current shielding region in the vicinity of reinforcing yarns is made small to lower the membrane resistance in the vicinity of reinforcing yarns, and at the same time, the volume of elution holes at a portion apart from reinforcing yarns is maintained to be small to some extent, whereby increase in the membrane resistance at this portion is suppressed. Thus, as compared with the degree of increase in membrane resistance at a portion apart from reinforcing yarns, the degree of decrease in the membrane resistance in the vicinity of reinforcing yarns becomes large, whereby it is considered that, as the entire membrane, the membrane resistance becomes low, and even if the spacing of reinforcing yarns is made narrow to increase the membrane strength, it is possible to reduce the electrolysis voltage at the time of alkali chloride electrolysis.

Other Embodiments

Further, the ion exchange membrane of the present invention is not limited to the ion-exchange membrane 1 as described above.

For example, the ion exchange membrane of the present invention may be one wherein the electrolyte membrane is a membrane of a single layer, or a laminate having layers other than the layer (C) and the layer (S). Further, it may be one wherein the reinforcing material is embedded in the layer (C).

Further, the sacrificial yarns are not limited to multifilaments as illustrated in the drawings, and may be monofilaments.

<Alkali Chloride Electrolysis Apparatus>

Figure 3:
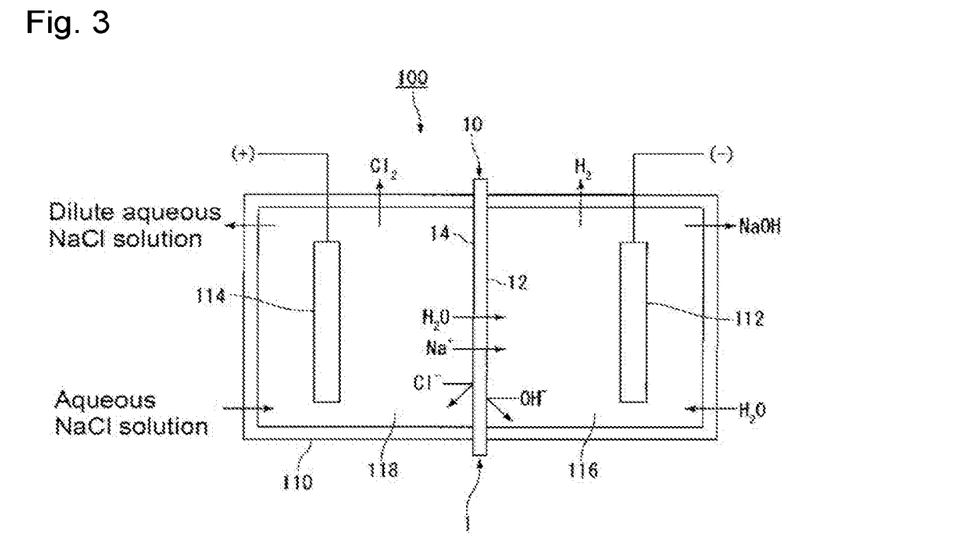
FIG. 3 is a schematic diagram showing an example of the alkali chloride electrolysis apparatus of the present invention.

For the alkali chloride electrolysis apparatus of the present invention, a known embodiment may be employed except for using the ion exchange membrane for alkali chloride electrolysis of the present invention. FIG. 3 is a schematic diagram showing an example of the alkali chloride electrolysis apparatus of the present invention.

The alkali chloride electrolysis apparatus 100 of this embodiment comprises an electrolytic cell 110 provided with a cathode 112 and an anode 114, and an ion exchange membrane 1 installed in the electrolytic cell 110 so as to partition inside of the electrolytic cell 110 into a cathode chamber 116 on the cathode 112 side and an anode chamber 118 on the anode 114 side.

The ion exchange membrane 1 is installed in the electrolytic cell 110 so that the layer (C) 12 is located on the cathode 112 side, and the layer (S) 14 is located on the anode 114 side.

The cathode 112 may be disposed in contact with the ion exchange membrane 1 or may be disposed with a space from the ion exchange membrane 1.

As the material constituting the cathode chamber 116, preferred is a material which is resistant to sodium hydroxide and hydrogen. As such a material, stainless steel, nickel, etc. may be mentioned.

As the material constituting the anode chamber 118, preferred is a material which is resistant to sodium chloride and chlorine. As such a material, titanium may be mentioned.

As the substrate of the cathode, stainless steel or nickel is, for example, preferred from the viewpoint of resistance to sodium hydroxide and hydrogen, and workability. As the substrate of the anode, titanium is preferred from the viewpoint of resistance to sodium chloride and chlorine, and workability. The surface of the electrode substrate is preferably coated with, for example, ruthenium oxide, iridium oxide, etc.

For example, in a case where an aqueous solution of sodium hydroxide is to be produced by electrolysis of an aqueous sodium chloride solution, by supplying an aqueous sodium chloride solution to the anode chamber 118 of the alkali chloride electrolysis apparatus 100, and supplying an aqueous sodium hydroxide solution to the cathode compartment 116, the aqueous sodium chloride solution is electrolyzed while maintaining the concentration of the aqueous sodium hydroxide solution discharged from the cathode chamber 116 at a predetermined concentration (e.g. 32 mass %).

According to the alkali chloride electrolysis apparatus of the present invention as described above, the membrane strength is high, and it is possible to reduce the electrolysis voltage during the alkaline chloride electrolysis.

EXAMPLES

In the following, the present invention will be described in detail with reference to Examples, but the present invention is not limited by these Examples. Ex. 1 to 4, 9 and 14 are Examples of the present invention, and Ex. 5 to 8 and 10 to 13 are Comparative Examples.

[Measurement Method of TQ Value]

The TQ value is a value related to the molecular weight of a polymer and was obtained as a temperature showing a volume flow rate of 100 mm³/sec. The volume flow rate is a flow out amount (unit: mm³/sec.) when a fluoropolymer having groups convertible to ion exchange groups, is melted and permitted to flow out from an orifice (diameter: 1 mm, length: 1 mm) at a constant temperature under a pressure of 3 MPa, by using Shimadzu Flow Tester CFD-100D (manufactured by Shimadzu Corporation).

[Measurement Method of Ion Exchange Capacity]

About 0.5 g of a fluoropolymer having groups convertible to ion exchange groups was formed into a film by flat pressing, and then, the film was analyzed by a transmission infrared spectroscopy apparatus, whereupon the ion exchange capacity was calculated by using the respective peak heights of $CF_2$ peak, $CF_3$ peak and OH peak, of the obtained spectra.

[Measurement Method of Distance of Reinforcing Yarns and Elution Holes]

By observing a cross section cut perpendicular to the length direction of reinforcing yarns, of an ion exchange membrane dried at 90° C. for at least 2 hours, by an optical microscope, the distance was measured by using an image software. In the measurement, in each of the MD cross section and the TD cross section, the distance from the center of a reinforcing yarn to the center of the adjacent reinforcing yarn was measured at 10 points. With respect to the MD cross section, the average distance (d1) being an average value of the measured values at 10 points, was obtained. Also with respect to the TD cross section, the average distance (d1) was obtained in the same manner. Further, the average distances (d2) and (d3) were obtained in the same manner.

Here, the average distances (d1), (d2) and (d3) are values of a reinforcing material embedded in an ion exchange membrane produced via the steps (a) and (b).

[Measurement Method of Cross-Sectional Area]

By observing a cross section cut perpendicular to the length direction of reinforcing yarns, of an ion exchange membrane dried at 90° C. for at least 2 hours, by an optical microscope, the total area (S) obtained by adding the cross-sectional area of an elution hole and the cross-sectional area of a sacrificial yarn, was measured by using an image software. The total area (S) was measured at 10 points randomly selected in each of the MD cross section and the TD cross section. With respect to the MD cross section, the total area (S) was obtained as an average value of the measured values at 10 points. Also with respect to the TD cross section, the total area (S) was obtained in the same manner.

In a case where a sacrificial yarn is completely dissolved, the total area (S) is the cross-sectional area of the elution hole, and in a case where a sacrificial yarn remaining undissolved is present in an elution hole, the total area (S) is a value obtained by adding the cross-sectional area of the elution hole and the cross-sectional area of the sacrificial yarn remaining undissolved.

[Measurement Method of Width of Reinforcing Yarn]

By observing a cross section of an ion exchange membrane dried at 90° C. for at least 2 hours by an optical microscope, the width of a reinforcing yarn as viewed in a direction perpendicular to the fabric surface of a reinforcing material was measured by using an image software. The width of the reinforcing yarn was measured at 10 points randomly selected in each of the MD cross section and the TD cross section. With respect to the MD cross section, the width of the reinforcing yarn was obtained as an average value of the measured values at 10 points. Also with respect to the TD cross section, the width of the reinforcing yarn was obtained in the same manner.

[Measurement Method of Electrolysis Voltage]

The ion exchange membrane was installed in a test electrolytic cell with an electrolytic surface size of 150 mm×100 mm so that the layer (C) faced the cathode, and electrolysis of an aqueous sodium chloride solution was conducted under conditions of a sodium hydroxide concentration of 32 mass %, a sodium chloride concentration of 200 g/L, a temperature of 90° C. and a current density of 8 kA/m², whereby the electrolysis voltage (V) was measured after 3 to 10 days from the initiation of operation.

[Measurement of Aperture Ratio]

For the aperture ratio, by observing a cross section cut perpendicular to the length direction of reinforcing yarns, of an ion exchange membrane dried at 90° C. for at least 2 hours, by an optical microscope, the aperture ratio was calculated by using an image software. For the calculation, in each of the MD cross section (cross section cut perpendicular to the MD direction) and the TD cross section (cross section cut perpendicular to the TD direction), the distance from the center of a reinforcing yarn to the center of the adjacent reinforcing yarn, and the width of a reinforcing yarn were measured at 10 points, and the aperture ratio was calculated from the following formula.

{(Distance between reinforcing yarns in the MD cross section–width of reinforcing yarn in the MD cross section)×(distance between reinforcing yarns in the TD cross section–width of reinforcing yarn in the TD cross section)}/{(distance between reinforcing yarns in the MD cross section)×(distance between reinforcing yarns in TD cross section)}×100

Ex. 1

TFE and a fluoromonomer represented by the following formula (3-1) were copolymerized to synthesize a fluoropolymer (ion exchange capacity: 1.06 meq/g dry resin, TQ: 225° C.) (hereinafter referred to as polymer C).

$CF_2=CF-O-CF_2CF_2-CF_2-COOCH_3$  (3-1).

TFE and a fluoromonomer represented by the following formula (4-1) were copolymerized to synthesize a fluoropolymer (ion exchange capacity: 1.1 meq/g dry resin, TQ: 235° C.) (hereinafter referred to as polymer S).

$CF_2=CF-O-CF_2CF(CF_3)-O-CF_2CF_2-SO_2F$  (4-1).

The polymer C and the polymer S were molded by a co-extrusion method to obtain a film A of a two layer structure with a layer (C') (thickness: 12 μm) made of the polymer C and a layer (S') (thickness: 68 μm) made of the polymer S.

Further, the polymer S was molded by a melt extrusion method to obtain a film B (thickness: 30 μm).

A PTFE film was rapidly stretched and then slit to a thickness of 100 denier to obtain a monofilament, which was twisted 2,000 times/m to obtain a PTFE yarn, which was used as a reinforcing yarn. A PET yarn made of a multifilament of 40 denier having two PET filaments of 20 denier stretch-assembled, was used as a sacrificial yarn. Plain weaving was conducted so that one reinforcing yarn and four sacrificial yarns would be alternately arranged, to obtain a reinforcing fabric (density of reinforcing yarns: 27 yarns/inch, density of sacrificial yarns: 108 yarns/inch).

The film B, the reinforcing fabric, the film A and a release PET film (thickness: 100 μm) were overlaid in this order so that the layer (C') of the film A was located on the release PET film side, and laminated by using a roll. The release PET film was peeled off to obtain a reinforcing precursor membrane.

A paste comprising 29.0 mass % of zirconium oxide (average particle diameter: 1 μm), 1.3 mass % of methyl cellulose, 4.6 mass % of cyclohexanol, 1.5 mass % of cyclohexane and 63.6 mass % of water, was transferred by a roll press on the upper side of the layer (S') of the reinforcing precursor membrane, to form a gas-releasing coating layer. The attached amount of zirconium oxide was 20 g/m².

The reinforcing precursor film having the gas-releasing coating layer formed on one side, was immersed in an aqueous solution containing 5 mass % of dimethyl sulfoxide and 30 mass % of potassium hydroxide at 95° C. for 8 minutes. Thus, —COOCH₃ of the polymer C and —SO₂F of the polymer S were hydrolyzed and converted to ion exchange groups, to obtain a membrane having a precursor layer (C') as the layer (C) and the layer (S') as the layer (S).

In an ethanol solution containing 2.5 mass % of an acid-form polymer of polymer S, zirconium oxide (average particle diameter: 1 μm) was dispersed at a concentration of 13 mass %, to prepare a dispersion. The dispersion was sprayed on the layer (C) side of the membrane, to form a gas releasing coating layer, to obtain an ion exchange membrane having gas releasing coating layers formed on both surfaces. The attached amount of zirconium oxide was 3 g/m².

Ex. 2

An ion exchange membrane was obtained in the same manner as in Ex. 1, except that as the sacrificial yarn, a PET yarn made of a multifilament of 32 denier having two PET filaments of 16 denier stretch-assembled, was used.

Ex. 3

An ion exchange membrane was obtained in the same manner as in Ex. 1, except that as the sacrificial yarn, a PET yarn made of a multifilament of 18 denier having two PET filaments of 9 denier stretch-assembled, was used.

Ex. 4

An ion exchange membrane was obtained in the same manner as in Ex. 1, except that as the sacrificial yarn, a PET yarn made of a monofilament of 9 denier was used.

Ex. 5

An ion exchange membrane was obtained in the same manner as in Ex. 1, except that as the sacrificial yarn, a PET yarn made of a multifilament of 30 denier having six monofilaments of 5 denier stretch-assembled and twisted, was used, and in the reinforcing fabric, the density of reinforcing yarns was 27 yarns/inch and the density of sacrificial yarns was 54 yarns/inch.

Ex. 6

Plain weaving was conducted in the same manner as in Ex. 1, except that as the sacrificial yarn, a PET yarn made of a multifilament of 32 denier having two PET filaments of 16 denier stretch-assembled, was used, and in the reinforcing material, the density of reinforcing yarns was 34 yarns/inch and the density of sacrificial yarns was 136 yarns/inch, but it was not possible to weave a fabric, since the sacrificial yarns were not fit between reinforcing yarns.

Ex. 7

Plain weaving was conducted in the same manner as in Ex. 1, except that as the sacrificial yarn, a PET yarn made of a monofilament of 5 denier was used, but it was not possible to weave a fabric, since the sacrificial yarns were broken.

Ex. 8

Plain weaving was conducted in the same manner as in Ex. 1, except that as the sacrificial yarn, a PET yarn made of a multifilament of 80 denier having two PET filaments of 40 denier stretch-assembled, was used, but it was not possible to weave a fabric, since the sacrificial yarns were not fit between reinforcing yarns.

Ex. 9

An ion exchange membrane was obtained in the same manner as in Ex. 1, except that as the sacrificial yarn, a PET yarn made of a multifilament of 20 denier having six monofilaments of 3.3 denier stretch-assembled and twisted, was used.

Ex. 10

An ion exchange membrane was obtained in the same manner as in Ex. 1, except that as the sacrificial yarn, a PET yarn made of a multifilament of 60 denier having two PET filaments of 30 denier stretch-assembled, was used.

Ex. 11

A PTFE film was rapidly stretched and then slit to a thickness of 100 denier to obtain a monofilament, which was twisted 450 times/m to obtain a PTFE yarn, which was used as a reinforcing yarn. An ion exchange membrane was obtained in the same manner as in Ex. 1, except that as the sacrificial yarn, a PET yarn made of a multifilament of 30 denier having six monofilaments of 5 denier stretch-assembled and twisted, was used, and in the reinforcing fabric, the density of reinforcing yarns was 21 yarns/inch and the density of sacrificial yarns was 42 yarns/inch.

Ex. 12

A PTFE film was rapidly stretched and then slit to a thickness of 100 denier to obtain a monofilament, which was twisted 450 times/m to obtain a PTFE yarn, which was used as a reinforcing yarn. An ion exchange membrane was obtained in the same manner as in Ex. 1, except that as the sacrificial yarn, a PET yarn made of a monofilament of 7 denier was used, and in the reinforcing fabric, the density of reinforcing yarns was 21 yarns/inch and the density of sacrificial yarns was 126 yarns/inch.

Ex. 13

A PTFE film was rapidly stretched and then slit to a thickness of 100 denier to obtain a monofilament, which was twisted 450 times/m to obtain a PTFE yarn, which was used as a reinforcing yarn. An ion exchange membrane was obtained in the same manner as in Ex. 1, except that as the sacrificial yarn, a PET yarn made of a multifilament of 30 denier having six monofilaments of 5 denier stretch-assembled and twisted, was used, and in the reinforcing fabric, the density of reinforcing yarns was 25 yarns/inch and the density of sacrificial yarns was 50 yarns/inch.

Ex. 14

A PTFE film was rapidly stretched and then slit to a thickness of 100 denier to obtain a monofilament, which was twisted 450 times/m to obtain a PTFE yarn, which was used as a reinforcing yarn. An ion exchange membrane was obtained in the same manner as in Ex. 1, except that as the sacrificial yarn, a PET yarn made of a monofilament of 9 denier was used, and in the reinforcing fabric, the density of reinforcing yarns was 25 yarns/inch and the density of sacrificial yarns was 135 yarns/inch.

The results of measurements of the average distances (d1), (d2) and (d3), the total area (S) per unit elution hole, the width of reinforcing yarn, and the electrolysis voltage, of the ion exchange membrane in each Ex., are shown in Table 1.

TABLE 1

| | | Unit | Ex. 1 | Ex. 2 | Ex. 3 | Ex. 4 | Ex. 5 | Ex. 6 | Ex. 7 |
|---|---|---|---|---|---|---|---|---|---|
| Reinforcing yarn | Fineness | Denier | 100 | 100 | 100 | 100 | 100 | 100 | 100 |
| | Filament | Number | 1 | 1 | 1 | 1 | 1 | 1 | 1 |
| | Density of yarns | Number/inch | 27 | 27 | 27 | 27 | 27 | 34 | 27 |
| Sacrificial yarn | Fineness | Denier | 40 | 32 | 18 | 9 | 30 | 32 | 5 |
| | Filament | Number | 2 | 2 | 2 | 1 | 6 | 2 | 1 |
| | Density of yarns | Number/inch | 108 | 108 | 108 | 108 | 54 | 136 | 108 |
| Weaving (possible/not possible) | | — | Possible | Possible | Possible | Possible | Possible | Not possible | Not possible |
| MD cross section | d1 | μm | 860 | 844 | 824 | 853 | 867 | — | — |
| | S | μm² | 3179 | 2576 | 1452 | 726 | 2407 | — | — |
| | n | Number | 4 | 4 | 4 | 4 | 2 | — | — |
| | d2 | μm | 152 | 156 | 150 | 147 | 121 | — | — |
| | d2/d1 × (n + 1) | — | 0.88 | 0.92 | 0.91 | 0.86 | 0.42 | — | — |
| | d3 | μm | 202 | 188 | 187 | 206 | 373 | — | — |
| | d3/d1 × (n + 1) | — | 1.17 | 1.11 | 1.13 | 1.21 | 1.29 | — | — |
| | Width of reinforcing yarn | μm | 120 | 123 | 105 | 110 | 101 | — | — |

| | | Unit | Ex. 1 | Ex. 2 | Ex. 3 | Ex. 4 | Ex. 5 | Ex. 6 | Ex. 7 |
|---|---|---|---|---|---|---|---|---|---|
| TD cross section | d1 | μm | 877 | 869 | 854 | 850 | 893 | — | — |
| | S | μm² | 3222 | 2511 | 1501 | 701 | 2589 | — | — |
| | n | Number | 4 | 4 | 4 | 4 | 2 | — | — |
| | d2 | μm | 161 | 157 | 144 | 140 | 245 | — | — |
| | d2/d1 × (n + 1) | — | 0.92 | 0.90 | 0.84 | 0.82 | 0.82 | — | — |
| | d3 | μm | 197 | 199 | 211 | 215 | 324 | — | — |
| | d3/d1 × (n + 1) | — | 1.12 | 1.14 | 1.24 | 1.26 | 1.09 | — | — |
| | Width of reinforcing yarn | μm | 110 | 119 | 113 | 114 | 103 | — | — |

TABLE 1-continued

| | | Unit | | | | | | | |
|---|---|---|---|---|---|---|---|---|---|
| Average of MD cross section and TD cross section | d1 | μm | 869 | 857 | 839 | 852 | 880 | — | — |
| | S | μm² | 3201 | 2544 | 1477 | 714 | 2498 | — | — |
| | n | Number | 4 | 4 | 4 | 4 | 2 | — | — |
| | d2 | μm | 157 | 157 | 147 | 144 | 183 | — | — |
| | d2/d1 × (n + 1) | — | 0.90 | 0.91 | 0.88 | 0.84 | 0.62 | — | — |
| | d3 | μm | 200 | 194 | 199 | 211 | 349 | — | — |
| | d3/d1 × (n + 1) | — | 1.15 | 1.13 | 1.19 | 1.23 | 1.19 | — | — |
| | Width of reinforcing yarn | μm | 115 | 121 | 109 | 112 | 102 | — | — |
| | Aperture ratio | % | 75 | 74 | 75 | 75 | 78 | — | — |
| | Electrolysis voltage | V | 3.29 | 3.27 | 3.26 | 3.30 | 3.32 | — | — |

| | | Unit | Ex. 8 | Ex. 9 | Ex. 10 | Ex. 11 | Ex. 12 | Ex. 13 | Ex. 14 |
|---|---|---|---|---|---|---|---|---|---|
| Reinforcing yarn | Fineness | Denier | 100 | 100 | 100 | 100 | 100 | 100 | 100 |
| | Filament Number | Number | 1 | 1 | 1 | 1 | 1 | 1 | 1 |
| | Density of yarns | Number/inch | 27 | 27 | 27 | 21 | 21 | 25 | 25 |
| Sacrificial yarn | Fineness | Denier | 80 | 20 | 60 | 30 | 7 | 30 | 9 |
| | Filament Number | Number | 2 | 6 | 2 | 6 | 1 | 6 | 1 |
| | Density of yarns | Number/inch | 108 | 108 | 108 | 42 | 126 | 50 | 150 |
| Weaving (possible/not possible) | | — | Not possible | Possible | Possible | Possible | Possible | Possible | Possible |
| MD cross section | d1 | μm | — | 850 | 878 | 1030 | 1060 | 925 | 915 |
| | S | μm² | — | 1810 | 5412 | 2500 | 530 | 2398 | 814 |
| | n | Number | — | 4 | 4 | 2 | 6 | 2 | 6 |
| | d2 | μm | — | 160 | 175 | 145 | 129 | 138 | 120 |
| | d2/d1 × (n + 1) | — | — | 0.94 | 1.00 | 0.42 | 0.85 | 0.45 | 0.92 |
| | d3 | μm | — | 185 | 177 | 443 | 208 | 394 | 158 |
| | d3/d1 × (n + 1) | — | — | 1.09 | 1.00 | 1.29 | 1.37 | 1.29 | 1.20 |
| | Width of reinforcing yarn | μm | — | 120 | 122 | 158 | 155 | 155 | 151 |

| | | Unit | Ex. 8 | Ex. 9 | Ex. 10 | Ex. 11 | Ex. 12 | Ex. 13 | Ex. 14 |
|---|---|---|---|---|---|---|---|---|---|
| TD cross section | d1 | μm | — | 860 | 888 | 1032 | 1040 | 922 | 912 |
| | S | μm² | — | 1800 | 5416 | 2513 | 528 | 2450 | 820 |
| | n | Number | — | 4 | 4 | 2 | 6 | 2 | 6 |
| | d2 | pm | — | 159 | 172 | 320 | 131 | 290 | 124 |
| | d2/d1 × (n + 1) | — | — | 0.92 | 0.97 | 0.93 | 0.88 | 0.94 | 0.95 |
| | d3 | μm | — | 192 | 186 | 356 | 193 | 316 | 146 |
| | d3/d1 × (n + 1) | — | — | 1.11 | 1.05 | 1.03 | 1.30 | 1.03 | 1.12 |
| | Width of reinforcing yarn | μm | — | 113 | 121 | 155 | 152 | 153 | 152 |
| Average of MD cross section and TD cross section | d1 | μm | — | 855 | 883 | 1031 | 1050 | 924 | 914 |
| | S | μm² | — | 1805 | 5414 | 2507 | 529 | 2424 | 817 |
| | n | Number | — | 4 | 4 | 2 | 6 | 2 | 6 |
| | d2 | μm | — | 160 | 174 | 233 | 130 | 214 | 122 |
| | d2/d1 × (n + 1) | — | — | 0.93 | 0.99 | 0.68 | 0.87 | 0.70 | 0.94 |
| | d3 | μm | — | 189 | 182 | 400 | 201 | 355 | 152 |
| | d3/d1 × (n + 1) | — | — | 1.10 | 1.03 | 1.16 | 1.34 | 1.16 | 1.16 |
| | Width of reinforcing yarn | μm | — | 117 | 122 | 157 | 154 | 154 | 152 |
| | Aperture ratio | % | — | 75 | 74 | 72 | 73 | 70 | 70 |
| | Electrolysis voltage | V | — | 3.25 | 3.32 | 3.33 | 3.33 | 3.34 | 3.28 |

As shown in Table 1, in Ex. 1 to 4 and 9 using ion exchange membranes wherein the average distance (d1) was from 750 to 1,000 μm, the total area (S) was from 500 to 5,000 μm per elution hole and the number n of the elution holes was 4, the electrolysis voltage was low as compared with Ex. 5 using an ion exchange membrane wherein the number n of elution holes was 2, and Ex. 10 using an ion exchange membrane wherein the total area (S) exceeded 5,000 μm², despite the average distance (d1) was equivalent.

In Ex. 6, the average distance (d1) is expected to be narrower than 750 μm, but the sacrificial yarns were not fit between reinforcing yarns, whereby weaving was not possible. In Ex. 7, the total area (S) is expected to be smaller than 500 μm² per elution hole, but sacrifice yarns were broken, whereby weaving was not possible. In Ex. 8, the total area (S) per one elution hole is expected to be larger than 5,000 μm², but, the sacrificial yarns were not fit between reinforcing yarns, whereby weaving was not possible.

In Ex. 11 and 13, a PTFE film was rapidly stretched and then slit to a thickness of 100 denier to obtain a monofilament, which was twisted 450 times/m to obtain a PTFE yarn, and such a PTFE yarn was used as a reinforcing yarn, whereby the width of the reinforcing yarn was wider than in Ex. 5 wherein a PTFE yarn obtained by twisting 2,000 times/m was used as a reinforcing yarn. Therefore, the average distance (d1) was larger than In Ex. 5, but the electrolysis voltage was large.

In Ex. 12 using an ion exchange membrane wherein the average distance (d1) exceeded 1,000 μm, the total area (S) per one elution hole was from 500 to 5,000 μm², and the number n of elution holes was 6, but no decrease in electrolysis voltage was confirmed as compared with Ex. 11 using an ion exchange membrane wherein the number of elution holes was 2.

In Ex. 14 using an ion exchange membrane wherein the average distance (d1) was from 750 to 1,000 μm, the total area S was from 500 to 5,000 μm² per one elution hole, and the number n of elution holes was 6, the electrolysis voltage was low as compared to Ex. 13, despite the average value d1 of the distance was equal.

Further, in Ex. 1 to 4, 9 and 14, in the measurements of the average distances (d1), (d2) and (d3), the total area (S)

and the width of a reinforcing yarn, the measured values were all in the above-mentioned ranges at each of the 10 points.

INDUSTRIAL APPLICABILITY

The ion exchange membrane of the present invention is useful extensively for alkali chloride electrolysis apparatus, since even when the spacing of reinforcing yarns is made narrow to increase the membrane strength, the membrane resistance is low and it is possible to reduce the electrolysis voltage.

This application is a continuation of PCT Application No. PCT/JP2015/073401, filed on Aug. 20, 2015, which is based upon and claims the benefit of priority from Japanese Patent Application No. 2014-167278 filed on Aug. 20, 2014. The contents of those applications are incorporated herein by reference in their entireties.

REFERENCE SYMBOLS

1: ion exchange membrane for alkali chloride electrolysis, 10: electrolyte membrane, 12: layer (C), 14*a*, 14*b*: layer (S), 20: reinforcing material, 22: reinforcing yarn, 24: sacrificial yarn, 26: filament, 28: elution hole

What is claimed is:

1. An ion exchange membrane for alkali chloride electrolysis comprising a fluoropolymer having at least one ion exchange group, a reinforcing material embedded in the fluoropolymer and formed of reinforcing yarns and sacrificial yarns, and elution holes, through which at least a portion of the sacrificial yarns has been eluted, present between the reinforcing yarns,
   wherein in a cross section perpendicular to a length direction of the reinforcing yarns of the reinforcing material, an average distance (d1) from the center of a reinforcing yarn to the center of an adjacent reinforcing yarn is from 800 μm to 1,000 μm, and a total area (S) obtained by adding a cross-sectional area of an elution hole and a cross-sectional area of a sacrificial yarn, when a portion of the sacrificial yarn remains in the elution hole, is from 500 μm$^2$ to 5000 μm$^2$ per elution hole, and
   wherein the number n of elution holes between adjacent reinforcing yarns is from 4 to 6.

2. The ion exchange membrane according to claim 1, wherein a relationship is established to satisfy the following formula (1) in the cross section perpendicular to the length direction of the reinforcing yarns:

$$0.5 < \{d2/d1 \times (n+1)\} < 1.5 \qquad (1),$$

wherein
d1 is the average distance from the center of a reinforcing yarn to the center of an adjacent reinforcing yarn,
d2 is an average distance from the center of an elution hole to the center of an adjacent elution hole, and
n is the number of elution holes between adjacent reinforcing yarns.

3. The ion exchange membrane according to claim 2, wherein a relationship is established to satisfy the following formula (1') at all measurement points measured to determine the average distance (d1) and the average distance (d2) in the cross section perpendicular to the length direction of the reinforcing yarns:

$$0.4 < \{d2'/d1 \times (n+1)\} < 1.6 \qquad (1'),$$

wherein
d2' is a distance from the center of an elution hole to the center of an adjacent elution hole.

4. The ion exchange membrane according to claim 1, wherein a relationship is established to satisfy the following formula (2) in the cross section perpendicular to the length direction of the reinforcing yarns:

$$0.5 < \{d3/d1 \times (n+1)\} < 1.5 \qquad (2),$$

wherein d3 is an average distance from the center of a reinforcing yarn to the center of the adjacent elution hole,
d1 is the average distance from the center of a reinforcing yarn to the center of an adjacent reinforcing yarn, and
n is the number of elution holes between adjacent reinforcing yarns.

5. The ion exchange membrane according to claim 4, wherein a relationship is established to satisfy the following formula (2') at all measurement points measured to determine the average distance (d1) and the average distance (d3) in the cross section perpendicular to the length direction of the reinforcing yarns:

$$0.4 < \{d3'/d1 \times (n+1)\} < 1.6 \qquad (2'),$$

wherein
d3' is a distance from the center of a reinforcing yarn to the center of the adjacent elution hole.

6. The ion exchange membrane according to claim 1, wherein a width of the reinforcing yarns from the direction perpendicular to a surface of the membrane is from 70 μm to 160 μm.

7. The ion exchange membrane according to claim 1, wherein the fluoropolymer comprises a fluoropolymer having at least one group carboxylic acid functional group and a fluoropolymer having at least one group sulfonic acid functional group, and wherein the reinforcing material is embedded in the fluoropolymer having at least one group sulfonic acid functional group.

8. An alkali chloride electrolysis apparatus comprising an electrolytic cell comprising a cathode, an anode, and the ion exchange membrane of claim 1 partitioning a cathode chamber on a cathode side and an anode chamber on an anode side in the electrolytic cell.

9. A method for producing an ion exchange membrane for alkali chloride electrolysis, the method comprising:
   obtaining a reinforcing precursor membrane comprising a reinforcing fabric composed of reinforcing yarns and sacrificial yarns, embedded in a precursor membrane comprising a fluoropolymer having at least one group convertible to an ion exchange group, and
   then contacting the reinforcing precursor membrane with an alkaline aqueous solution to convert the at least one group convertible to an ion exchange group, to the ion exchange group, and at the same time to elute at least a portion of the sacrificial yarn in the reinforcing fabric, thereby obtaining an ion exchange membrane comprising a fluoropolymer having at least one ion exchange group,
   wherein a reinforcing material has at least a portion of the sacrificial yarns in an eluted reinforcing fabric and elution holes,
   wherein in a cross section perpendicular to a length direction of the reinforcing yarns in the ion exchange membrane, a total area (S) obtained by adding a cross-sectional area of an elution hole and a cross-sectional area of a sacrificial yarn remaining in the elution hole, is from 500 μm² to 5000 μm² per elution hole, and the number n of elution holes between adjacent reinforcing yarns is from 4 to 6, and wherein in a cross section perpendicular to a length direction of the reinforcing yarns of the reinforcing material, an average distance (d1) from the center of a reinforcing yarn to the center of an adjacent reinforcing yarn is from 800 μm to 1,000 μm.

10. The method according to claim 9, wherein a relationship is established to satisfy the following formula (1) in the cross section perpendicular to the length direction of the reinforcing yarns:

$$0.5 < \{d2/d1 \times (n+1)\} < 1.5 \qquad (1),$$

wherein d1 is the average distance from the center of a reinforcing yarn to the center of an adjacent reinforcing yarn, d2 is an average distance from the center of an elution hole to the center of an adjacent elution hole, and n is the number of elution holes between adjacent reinforcing yarns.

11. The method according to claim 10, wherein a relationship is established to satisfy the following formula (1') at all measurement points measured to determine the average distance (d2) in the cross section perpendicular to the length direction of the reinforcing yarns:

$$0.4 < \{d2'/d1 \times (n+1)\} < 1.6 \qquad (1'),$$

wherein d2' is a distance from the center of an elution hole to the center of an adjacent elution hole.

12. The method according to claim 9, wherein a relationship is established to satisfy the following formula (2) in the cross section perpendicular to the length direction of the reinforcing yarn:

$$0.5 < \{d3/d1 \times (n+1)\} < 1.5 \qquad (2),$$

wherein d3 is an average distance from the center of a reinforcing yarn to the center of an adjacent elution hole or sacrificial yarn, d1 is the average distance from the center of a reinforcing yarn to the center of an adjacent reinforcing yarn, and n is the number of elution holes between adjacent reinforcing yarns.

13. The method according to claim 12, wherein a relationship is established to satisfy the following formula (2') at all measurement points measured to determine the average distance (d3) in the cross section perpendicular to the length direction of the reinforcing yarns:

$$0.4 < \{d3'/d1 \times (n+1)\} < 1.6 \qquad (2'),$$

wherein d3' is a distance from the center of a reinforcing yarn to the center of an adjacent elution hole.

14. The method according to claim 9, wherein a width of the reinforcing yarns in the direction perpendicular to a surface of the membrane is from 70 μm to 160 μm.

15. A method for producing an alkaline chloride electrolysis apparatus, the method comprising:

obtaining an ion exchange membrane for alkali chloride electrolysis by the method of claim 9, and then disposing the ion exchange membrane as an electrolyte membrane partitioning a cathode chamber on a cathode side and an anode chamber on an anode side in an electrolytic cell.

16. The ion exchange membrane according to claim 1, wherein the average distance (d1) is from 800 μm to 930 μm.

17. The ion exchange membrane according to claim 1, wherein the total area (S) is from 500 μm² to 4000 μm² per elution hole.

18. The ion exchange membrane according to claim 1, wherein the total area (S) is from 1,000 μm² to 4000 μm² per elution hole.

* * * * *